(12) United States Patent
Kato

(10) Patent No.: US 7,847,849 B2
(45) Date of Patent: Dec. 7, 2010

(54) SOLID-STATE IMAGING DEVICE, DRIVING METHOD THEREOF, AND CAMERA

(75) Inventor: Yoshiaki Kato, Shiga (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 11/776,979

(22) Filed: Jul. 12, 2007

(65) Prior Publication Data

US 2008/0018770 A1     Jan. 24, 2008

(30) Foreign Application Priority Data

Jul. 19, 2006  (JP) .............................. 2006-197493

(51) Int. Cl.
*H04N 5/335* (2006.01)
*H01L 27/108* (2006.01)

(52) U.S. Cl. ...................... 348/314; 348/243; 348/245; 348/251; 348/294; 348/311; 257/297

(58) Field of Classification Search .............. 348/314, 348/311, 243, 245, 251, 249, 294; 257/297
See application file for complete search history.

(56) References Cited

U.S. PATENT DOCUMENTS

| | | | | |
|---|---|---|---|---|
| 4,498,105 A * | 2/1985 | Crawshaw | ................ | 348/245 |
| 4,660,090 A * | 4/1987 | Hynecek | .................... | 348/311 |
| 6,519,000 B1 | 2/2003 | Udagawa | | |
| 7,148,524 B2 * | 12/2006 | Ozumi | ...................... | 257/223 |
| 2004/0150729 A1 * | 8/2004 | Nishizawa et al. | .......... | 348/243 |
| 2004/0150733 A1 | 8/2004 | Nagayoshi et al. | | |
| 2005/0017154 A1 * | 1/2005 | Ozumi | .................. | 250/208.1 |
| 2007/0165128 A1 | 7/2007 | Kato | | |

FOREIGN PATENT DOCUMENTS

| | | |
|---|---|---|
| JP | 9-18792 | 1/1997 |
| JP | 2004-180284 | 6/2004 |

OTHER PUBLICATIONS

English language Abstract of JP 9-18792.
English language Abstract of JP 2004-180284.
U.S. Appl. No. 11/697,498 to Kato, which was filed Apr. 6, 2007.

* cited by examiner

Primary Examiner—David L Ometz
Assistant Examiner—Quang V Le
(74) Attorney, Agent, or Firm—Greenblum & Bernstein P.L.C.

(57) ABSTRACT

A solid-state imaging device includes: a plurality of light-receiving elements which are arranged by rows and columns. A driving unit performs a driving, so that a signal packet and a plurality of dummy packets in an identical column are mixed together into a mixed packet in each holding units, charges of the mixed packet are held in a hold unit, the held charges of the mixed packet are vertically transferred to a horizontal transfer unit so that the mixed packet is mixed with a mixed packet of a different hold unit which is vertically transferred from the different hold unit to the horizontal transfer unit.

7 Claims, 37 Drawing Sheets

FIG. 2A

| R | 1 | 2 | 3 | 1 | 2 | 3 | 1 | 2 | 3 | 1 | 2 | 3 | 1 | 2 | 3 |
|---|---|---|---|---|---|---|---|---|---|---|---|---|---|---|---|
| | L | | | | | | | | | | | | | | |
| | | B | | | | | | | | | | | | | |
| D(9,1) | D(9,2) | D(9,3) | D(9,4) | D(9,5) | D(9,6) | D(9,7) | D(9,8) | D(9,9) | D(9,10) | D(9,11) | D(9,12) |
| D(8,1) | D(8,2) | D(8,3) | D(8,4) | D(8,5) | D(8,6) | D(8,7) | D(8,8) | D(8,9) | D(8,10) | D(8,11) | D(8,12) |
| R(7,1) | G(7,2) | R(7,3) | G(7,4) | R(7,5) | G(7,6) | R(7,7) | G(7,8) | R(7,9) | G(7,10) | R(7,11) | G(7,12) |
| D(6,1) | D(6,2) | D(6,3) | D(6,4) | D(6,5) | D(6,6) | D(6,7) | D(6,8) | D(6,9) | D(6,10) | D(6,11) | D(6,12) |
| D(5,1) | D(5,2) | D(5,3) | D(5,4) | D(5,5) | D(5,6) | D(5,7) | D(5,8) | D(5,9) | D(5,10) | D(5,11) | D(5,12) |
| G(4,1) | B(4,2) | G(4,3) | B(4,4) | G(4,5) | B(4,6) | G(4,7) | B(4,8) | G(4,9) | B(4,10) | G(4,11) | B(4,12) |
| D(3,1) | D(3,2) | D(3,3) | D(3,4) | D(3,5) | D(3,6) | D(3,7) | D(3,8) | D(3,9) | D(3,10) | D(3,11) | D(3,12) |
| D(2,1) | D(2,2) | D(2,3) | D(2,4) | D(2,5) | D(2,6) | D(2,7) | D(2,8) | D(2,9) | D(2,10) | D(2,11) | D(2,12) |
| R(1,1) | G(1,2) | R(1,3) | G(1,4) | R(1,5) | G(1,6) | R(1,7) | G(1,8) | R(1,9) | G(1,10) | R(1,11) | G(1,12) |
| | | D(0,3) | | | D(0,6) | | | D(0,9) | | | D(0,12) |

Vertical Transfer Stage

Vertical Final Stage

| | | | | | | | | | | | R | L | B | | | | | | | | | | | |
|---|---|---|---|---|---|---|---|---|---|---|---|---|---|---|---|---|---|---|---|---|---|---|---|---|
| | | | | | | | | | | | 1 | 2 | 3 | 1 | 2 | 3 | 1 | 2 | 3 | 1 | 2 | 3 | 1 | 2 | 3 |

Vertical Final Stage

| D(3,2) | | | | | | | | | | | | | | D(9,3) | | | D(9,6) | | | D(9,9) | | | D(9,12) | |
| D(2,2) | | | | | | | | | | | | | | | | | | | | | | | | |
| G(1,2) | | | | | | | | | | | | | | | | | | | | | | | | |
| D(3,4) | D(6,1) | | | | | | | | | | | | | | | | | | | | | | | |
| D(2,4) | D(5,1) | | | | | | | | | | | | | | | | | | | | | | | |
| G(1,4) | G(4,1) | | | | | | | | | | | | | | | | | | | | | | | |
| D(2,6) | D(5,3) | | | | | | | | | | | | | | | | | | | | | | | |
| G(1,6) | G(4,3) | | | | | | | | | | | | | | | | | | | | | | | |
| D(0,6) | D(3,3) | | | | | | | | | | | | | | | | | | | | | | | |

| D(3,5) | D(6,2) | | D(3,8) | D(6,5) | D(9,2) | D(3,11) | D(6,8) | D(9,5) | D(3,14) | D(6,11) | D(9,8) | D(3,17) | D(6,14) | D(9,11) | D(3,20) |
| D(2,5) | D(5,2) | | D(2,8) | D(5,5) | D(8,2) | D(2,11) | D(5,8) | D(8,5) | D(2,14) | D(5,11) | D(8,8) | D(2,17) | D(5,14) | D(8,11) | D(2,20) |
| R(1,5) | B(4,2) | | G(1,8) | G(4,5) | G(7,2) | R(1,11) | B(4,8) | R(7,5) | G(1,14) | G(4,11) | G(7,8) | R(1,17) | B(4,14) | R(7,11) | G(1,20) |
| D(3,7) | D(6,4) | D(9,1) | D(3,10) | D(6,7) | D(9,4) | D(3,13) | D(6,10) | D(9,7) | D(3,16) | D(6,13) | D(9,10) | D(3,19) | D(6,16) | D(9,13) | D(3,22) |
| D(2,7) | D(5,4) | D(8,1) | D(2,10) | D(5,7) | D(8,4) | D(2,13) | D(5,10) | D(8,7) | D(2,16) | D(5,13) | D(8,10) | D(2,19) | D(5,16) | D(8,13) | D(2,22) |
| R(1,7) | B(4,4) | R(7,1) | G(1,10) | G(4,7) | G(7,4) | R(1,13) | B(4,10) | R(7,7) | G(1,16) | G(4,13) | G(7,10) | R(1,19) | B(4,16) | R(7,13) | G(1,22) |
| D(2,9) | D(5,6) | D(8,3) | D(2,12) | D(5,9) | D(8,6) | D(2,15) | D(5,12) | D(8,9) | D(2,18) | D(5,15) | D(8,12) | D(2,21) | D(5,18) | D(8,15) | D(2,24) |
| R(1,9) | B(4,6) | R(7,3) | G(1,12) | G(4,9) | G(7,6) | R(1,15) | B(4,12) | R(7,9) | G(1,18) | G(4,15) | G(7,12) | R(1,21) | B(4,18) | R(7,15) | G(1,24) |
| D(0,9) | D(3,6) | D(6,3) | D(0,12) | D(3,9) | D(6,6) | D(0,15) | D(3,12) | D(6,9) | D(0,18) | D(3,15) | D(6,12) | D(0,21) | D(3,18) | D(6,15) | D(0,24) |

Horizontal Transfer Unit

FIG. 5P

SOLID-STATE IMAGING DEVICE, DRIVING METHOD THEREOF, AND CAMERA

BACKGROUND OF THE INVENTION (1) Field of the Invention

The present invention relates to: a solid-state imaging device which includes two-dimensionally arranged light-receiving elements, vertical transfer units, and a horizontal transfer unit, and outputs image signals; a driving method of the device; and a camera using the device, and particularly to a solid-state imaging device having a still picture imaging mode and a moving picture imaging mode; a driving method of the device; and a camera using the device.

(2) Description of the Related Art

Charge-Coupled Device (CCD) imaging sensors have been known as solid-state imaging devices each of which has a plurality of light-receiving elements for converting incident light into electrical charges and outputs the charges as image signals. Furthermore, digital still cameras using such solid-state imaging devices have become popular. In recent years, technologies of high pixel density in solid-state imaging devices have been developed, so that some digital still cameras can provide images whose resolution is higher than resolution of silver halide photographs.

The conventional solid-state imaging device includes a plurality of photoelectric conversion units, a plurality of vertical transfer units, a horizontal transfer unit, and an output unit. The photoelectric conversion units have color filters arranged in Bayer pattern array. Each of the vertical transfer units is formed corresponding to each column of the photoelectric conversion units, and vertically transfers signal charges read from each of the photoelectric conversion units to the horizontal transfer unit. The horizontal transfer unit horizontally transfers the signal charges received from the vertical transfer units. The output unit amplifies and then outputs the signal charges provided from the horizontal transfer units.

Most of digital still cameras have functions of imaging moving pictures as well as still pictures. The number of pixels in one still picture is generally more than 4 million pixels, for example, but for imaging moving picture, the number of pixels are usually reduced (hereinafter, referred to also as "thinned") to achieve necessary frequency (more than 30 frames per second, for example). A typical example of such pixel thinning in a vertical direction is selecting one photoelectric conversion unit from three neighboring photoelectric conversion units and reading signal charges from the selected photoelectric conversion unit to the vertical transfer unit.

Another example of the vertical pixel thinning is a method disclosed in Japanese Patent Application Publication No. 9-18792 (hereinafter, referred to as Patent Reference 1). By this method, to the horizontal transfer unit, signal charges are continuously and simultaneously transferred from neighboring vertical transfer stages in vertical transfer stages including in a vertical transfer unit. Thereby, signal charges in the neighboring vertical transfer stages are mixed in the horizontal transfer unit, so that it is possible to reduce the number of pixels in a vertical direction and thereby increase frame frequency more.

Moreover, Japanese Patent Application Publication No. 2004-180284 (hereinafter, referred to as Patent Reference 2) discloses a solid-state imaging device in which pixels are able to be reduced (thinned) in a horizontal direction. This solid-state imaging device has a vertical final stage in each vertical transfer unit. The vertical final stages in every (2n+1) columns (in every three columns, for example) have the same structure of transfer electrodes. Each vertical final stage in the (2n+1) columns has at least two transfer electrodes which are independent from electrodes of other columns, so that each column can be independently controlled to transfer signal charges from the vertical final stage to the horizontal transfer unit. For example, in the case where pixels of two different colors are alternately arranged in a row as in Bayer pattern array, every other pixels of the same color in a horizontal direction in the (2n+1) columns are selected to read signal charges, and the signal charges are transferred from the vertical final stages to the horizontal transfer unit and mixed together in the horizontal transfer unit. By repeating the above processing (2n+1) times, it is possible to reduce the number of pixels in a horizontal direction to one-(2n+1)th.

Thus, in the case where moving pictures are imaged by a solid-state imaging device whose total pixels are numerous, the pixels are reduced without lowering frame frequency. In this case, for preventing image quality defects, it is desirable to keep a balance between horizontal resolution and vertical resolution by reducing the number of pixels in both horizontal and vertical directions.

However, it is impossible to combine the structure disclosed in Patent Reference 1 for vertical pixel reduction with the structure disclosed in Patent Reference 2 for horizontal pixel reduction. More specifically, in the structure disclosed in Patent Reference 2, every other pixels of the same color in a horizontal direction in the vertical final stage are selected, and signal charges are read and transferred from the selected pixels and then mixed in the horizontal transfer unit. However, during the above processing, it is impossible at the same time to continuously transfer signal charges from all a plurality of vertical transfer units to the horizontal transfer unit, as the structure disclosed in Patent Reference 1. Therefore, if pixels are to be reduced also in a vertical direction when pixels are reduced in a horizontal direction using the technology of Patent Reference 2, the vertical pixel reduction has been realized by performing empty transfer using empty vertical transfer stages (empty transfer states) which are formed in some of the vertical transfer units and from which no signal charges are read out from photoelectric conversion units.

SUMMARY OF THE INVENTION

The above solution, however, has a problem that, when smears occur in an image of a light source imaged by extreme light intensity, for example, smear edges which should be straight lines appear as aliasing.

In more detail, in the case where signal charges of three every other pixels of same-color in a horizontal direction are mixed in the structure of Patent Reference 2, pixel data from three vertical transfer stages are cyclically located in an order of G1, G2, G3, R1, B2, and R3 in the horizontal transfer unit. Here, R, G, and B represent red, green, and blue colors, respectively, and numerals 1, 2, and 3 represent the first, second, and third vertical transfer stages sequentially farther from the horizontal transfer stage, respectively.

These pixel data are re-arranged at respective original mixed weighted centers in a displayed image. In the structure of Patent Reference 2, however, while signal charges are being horizontally transferred in the horizontal transfer unit, other electrical charges are transferred from the vertical final stages and mixed to the former signal charges in the horizontal transfer unit. Thereby, smear charges in an empty transfer stage in a vertical transfer unit are mixed to charges of a different column. Hereinafter, a vertical transfer stage among the vertical transfer stages, which holds signal charges corresponding to a light intensity read from a light-receiving element, is referred to as a signal packet, and a vertical transfer stage, to which charges are not read from a light-receiving element and which does not hold any signal charges, is referred to as an empty packet.

As a result, in an image in which pixel data are re-arranged in the respective original mixed weighted center, smear edges, which should be vertical straight lines, are deviated by a three-pixel position and appear as aliasing. Therefore, smears occurred in a line in a picture imaged in a still picture imaging mode is seen as aliasing in a picture imaged in a moving picture imaging mode. As a result, there is a problem that a user perceives deterioration in a moving picture more than in a still picture.

Even though smears do not occur, when signal charges are leaked from a vertical transfer stage to an empty transfer stage during transfer of signal charges in the vertical transfer stage, the leaked signal charges are mixed into charges of a different column in the horizontal transfer stage. As a result, a vertical line appears in an obtained image. Thus, there is a possibility of image quality defects due to transfer deterioration.

In view of the above-explained problems, an object of the present invention is to provide: a solid-state imaging device which prevents smear aliasing in transfer using empty transfer stages and thereby reduces image quality defects; a driving method of the device; and a camera using the device.

In order to solve above problems, the solid-state imaging device according to the present invention includes: a plurality of light-receiving elements which are arranged by rows and columns; a plurality of vertical transfer units each of which is arranged for a corresponding column of the light-receiving elements, and is operable to vertically transfer a plurality of signal packets and dummy packets in a moving picture imaging mode, the signal packet including charges read from the light-receiving elements which are thinned, the dummy packets being packets other than the signal packets, and N columns of the vertical transfer units forming one column group; a plurality of hold units which are arranged for final stages of the vertical transfer units in N columns except M column in the column group, and each of which is operable to mix, hold, and vertically transfer charges of the signal packets and the dummy packet without depending on vertical transfer from upstream of the corresponding vertical transfer unit; a horizontal transfer unit operable to mix, hold, and horizontally transfer the charges transferred from the hold units or the vertical transfer units in the M column in the column group; and a driving unit operable to drive the vertical transfer units, the hold units, and the horizontal transfer unit, wherein the driving unit perform the driving, so that, in the moving picture imaging mode, a signal packet and a plurality of dummy packets in an identical column are mixed together into a mixed packet in each of the holding units, charges of the mixed packet are held in the hold unit, the held charges of the mixed packet are vertically transferred to the horizontal transfer unit so that the mixed packet is mixed with a mixed packet of a different hold unit which is vertically transferred from the different hold unit to the horizontal transfer unit.

With the structure, the hold unit mixes charges of a signal packet and neighboring dummy packets in an identical column together into a mixed packet, and holds the resulting mixed packet. The horizontal transfer unit further mixes such a mixed packet to other packets. Thereby, charges of dummy packets mixed into the mixed packet by the hold unit are charges of only dummy packets in the same column as the column of the signal packet. In other words, the signal packet is not mixed with any dummy packets in columns different from the column of the signal packet. As a result, when smears occur, signal charges are not mixed with any dummy packets (including smear components) in columns different from the column of the signal charges, which makes it possible to prevent aliasing of smear edges. In addition, when signal charges are leaked from a vertical transfer stage to an empty transfer stage, so that it is possible to prevent image quality defects as vertical lines on an image, which is resulted from that the leaked signal charges are mixed to signal charges of a different column in the horizontal transfer unit.

Further, the hold units may be the final transfer stages of the vertical transfer units in N columns except M column in the column group, and have independent transfer electrodes. With the structure, final transfer stages of vertical transfer units in every N columns except M columns have independent transfer electrodes, and the electrodes are driven independently, so that it is possible to realize the above mixing in order to prevent the smear aliasing.

Furthermore, the hold units, each of which is formed between the horizontal transfer unit and each of the vertical transfer units in N columns except M column in the column group, may be operable to hold and transfer the charges independently in every N other columns.

With the structure, the hold unit which independently holds and transfers charges is formed between (i) the horizontal transfer unit and (ii) each of the vertical transfer units in columns each of which is a column in N columns except M columns in each column group, so that the transfer driving becomes easy which is suitable for speeding up a frame frequency.

Still further, the solid-state imaging device may further include: a memory operable to store data representing each of packets included in at least one row, the packets being outputted from the horizontal transfer unit; and a subtraction processing unit operable to reduce noise by performing subtraction processing using a first mixed packet and a second mixed packet, the first mixed packet being outputted from the horizontal transfer unit, and the second mixed packet being stored in the memory, wherein the first mixed packet is a packet in which the signal packet and the plurality of the dummy packets are mixed together, and the second mixed packet is a dummy packet among the packets stored in the memory, the dummy packet being obtained from a same column as a column of the first mixed packet.

Still further, the memory may be operable to store data of each packet included in at least one in-valid signal output row which is one of: a optical black output row of light-receiving elements outputting an optical black level; a dummy output row of dummy light-receiving elements; and an empty transfer output row outputting by vertical empty transfer. With the structure, a column of the second mixed packet having noise components such as smears corresponds to a column of the first mixed packet having signal components, so that it is possible to detect noise components per field. In addition, it is possible to reduce, from the first mixed packet, noise components generated from smears, dark currents, and the like, which results in further improved image quality.

Moreover, the driving method according to the present invention in use for a solid-state imaging device, the solid-state imaging device including: a plurality of light-receiving elements which are arranged by rows and columns; a plurality of vertical transfer units each of which is arranged for a corresponding column of the light-receiving elements, and is operable to vertically transfer a plurality of signal packets and dummy packets in a moving picture imaging mode, the signal packet including charges read from the light-receiving elements which are thinned, the dummy packets being packets other than the signal packets, and N columns of the vertical transfer units forming one column group; a plurality of hold units which are arranged for final stages of the vertical transfer units in N columns except M column in the column group, and each of which is operable to mix, hold, and vertically transfer charges of the signal packets and the dummy packet without depending on vertical transfer from upstream of the corresponding vertical transfer unit; a horizontal transfer unit operable to mix, hold, and horizontally transfer the charges transferred from the hold units or the vertical transfer units in the M column in the column group; and a driving unit operable to drive the vertical transfer units, the hold units, and the horizontal transfer unit, the driving method comprising: mixing, in the moving picture imaging mode, a signal packet and a plurality of dummy packets in an identical column into one mixed packet, in each of the holding units; holding charges of the mixed packet in the hold unit; and transferring vertically the charges of the mixed packet from the hold unit to the horizontal transfer unit so that the mixed packet is mixed with a mixed packet of a different hold unit which is vertically transferred from the different hold unit to the horizontal transfer unit.

Moreover, the camera according to the present invention includes the above-mentioned solid-state imaging device.

According to the present invention, it is possible to prevent smear aliasing due to transfer using empty transfer stages and thereby to reduce image quality defects due to transfer deterioration.

FURTHER INFORMATION ABOUT TECHNICAL BACKGROUND TO THIS APPLICATION

The disclosure of Japanese Patent Application No. 2006-197493 filed on Jul. 19, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate specific embodiments of the present invention. In the Drawings:

FIG. 2A is a diagram for explaining pixel mixing according to the first embodiment;

FIG. 2J is a diagram for explaining pixel mixing according to the first embodiment;

FIG. 2M is a diagram for explaining pixel mixing according to the first embodiment;

FIG. 2N is a diagram for explaining pixel mixing according to the first embodiment;

FIG. 5O is a diagram for explaining pixel mixing according to the second embodiment;

FIG. 5P is a diagram for explaining pixel mixing according to the second embodiment;

DESCRIPTION OF THE PREFERRED EMBODIMENT(S)

First Embodiment

A solid-state imaging device according to the first embodiment includes a plurality of hold units which are arranged for final stages of the vertical transfer units (transferors) in N columns except M columns (where M is the number equal to or more than 1, and in the embodiments M is 1 as one example) in the column group, and each of which is operable to mix, hold, and vertically transfer charges of the signal packets and the dummy packet without depending on vertical transfer from upstream of the corresponding vertical transfer unit. In a moving picture imaging mode, the hold unit mixes charges of a signal packet and neighboring dummy packets in an identical column together into a mixed packet, and holds the resulting mixed packet. The horizontal transfer unit (transferor) further mixes such a mixed packet with other packets. Here, the "signal packet" refers to a vertical transfer stage including signal charges read out from a light-receiving element, and the "dummy packet" refers to an originally empty vertical transfer stage since no signal charges are read from a light-receiving element to the dummy packet.

Thereby, charges of dummy packets mixed into the mixed packet by the hold unit are charges of only dummy packets in the same column as the column of the signal packet. In other words, the signal packet is not mixed with any dummy packets in columns different from the column of the signal packet. As a result, when smears occur, signal charges are not mixed with any dummy packets (including smear components) in columns different from the column of the signal charges, which makes it possible to prevent aliasing of smear edges.

Furthermore, the hold units according to the first embodiment are the final transfer stages of the vertical transfer units in N columns except M column in the column group, and have independent transfer electrodes. By using driving pulses applied to the independent transfer electrodes, it is possible to: perform vertical transfer independently in every N other columns; mix charges of a signal packet and dummy packets which are vertically transferred from the upstream, into a mixed packet; and hold the mixed packets.

Figure 1:
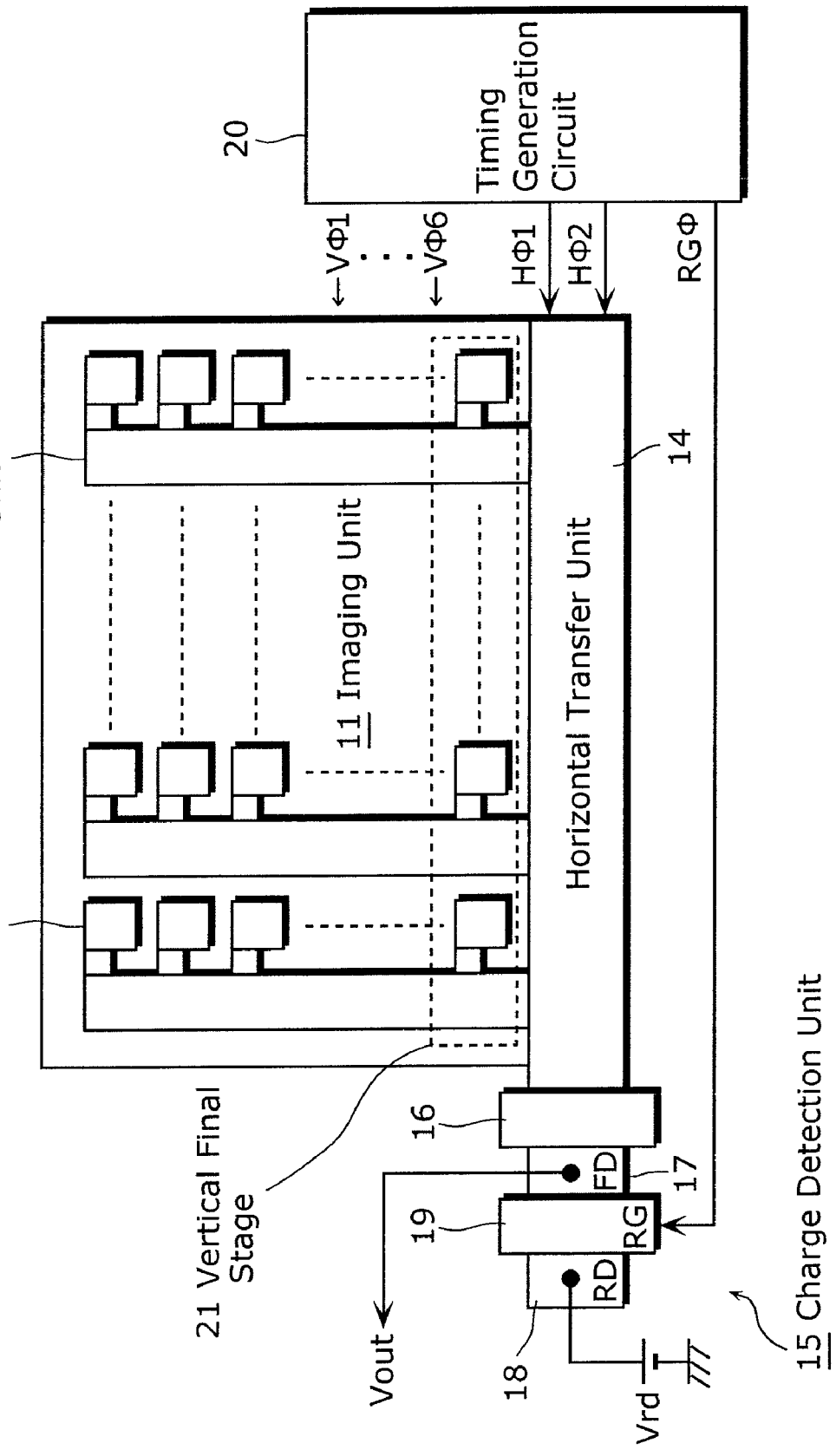
FIG. 1 is a block diagram showing a structure of a solid-state imaging device according to the first embodiment of the present invention.

FIG. 1 is a block diagram showing a structure of a solid-state imaging device according to the first embodiment of the present invention. The solid-state imaging device of FIG. 1 is operated in a moving picture imaging mode as well as a still picture imaging mode. In the moving picture imaging mode, a picture is imaged with resolution in which M (2, for example) pixels are thinned from N (3, for example) pixels in both vertical and horizontal directions. The solid-state imaging device of FIG. 1 includes a plurality of light-receiving elements 12, a plurality of vertical transfer units 13, a horizontal transfer unit 14, a charge detection unit 15, and a timing generation circuit 20.

The plurality of the light-receiving elements 12 are arranged by rows and columns. On the light-receiving elements 12, color filters are formed, for example, in Bayer pattern array.

Each of the vertical transfer units 13, which is formed corresponding to each column of the light-receiving elements 12, vertically transfers in the moving picture imaging mode (i) a plurality of signal packets including signal charges read from the pixels after the above thinning, and (ii) dummy packets which are packets other than the signal packets.

Each of final stages 21, which are in N (3, for example) columns except M (1, for example) columns in the respective vertical transfer units, serves as the above-mentioned hold unit, and is able to independently mix, hold, and vertically transfer the charges of the signal packets and the dummy packets. In FIG. 1, the vertical transfer units 13 are called R column, L column, B column, R column, L column, B column, ..., respectively, from the left. In the first embodiment, each of final transfer stages in R and L columns has transfer electrodes which are driven without depending on other all transfer stages in the same column. Each of the final transfer stages in B columns has transfer electrodes which are driven in the same way as other all transfer stages in the same column. In other words, each of the final transfer stages of R and L columns is able to be driven independently.

The horizontal transfer unit 14 mixes, holds, and horizontally transfer charges transferred from a plurality of the vertical transfer units 13.

In order to convert the charges transferred horizontally from the horizontal transfer unit 14 into voltage, the charge detection unit 15 has an output gate 16, a floating defusion (FD) unit 17, a reset drain (RD) unit 18, and a reset gate (RG) unit 19. The output gate 16 reads charges from a final stage of the horizontal transfer unit 14. The FD unit 17 holds the charges obtained by the output gate 16. The RD unit 18 drains the charges when the FD unit 17 is re-set. The RG unit 19 supplies a reset voltage to the FD unit 17.

The timing generation circuit 20 drives a plurality of the vertical transfer units 13 and the horizontal transfer unit 14. More specifically, the timing generation circuit 20 drives the vertical transfer units 13 and the horizontal transfer unit 14, so that, in the moving picture imaging mode, a signal packet and dummy packets in the identical column are mixed into one packet in each final stage 21, then charges in the mixed packet are held in the final stage, and the mixed packet is mixed in the horizontal transfer unit 13 with other packets of the same color which have been in other final stages.

Processing performed by the solid-state imaging device having the above-described structure is described herein.

FIGS. 2A to 2N are diagrams showing, as one example, how signal packets and dummy packets are transferred and mixed in the moving picture imaging mode. It is assumed that pixels are thinned to ⅓ in a horizontal direction, and that a ratio of the dummy packets to the signal packets is 1 to 2 in the vertical transfer unit 13. It is also assumed that, in the thinning, charges of three pixels in a vertical direction are mixed into one transfer packet, and that one transfer packet has six gates. It is also assumed that a vertical final stage also has six gates (not shown) to form one transfer packet.

Figure 2B:
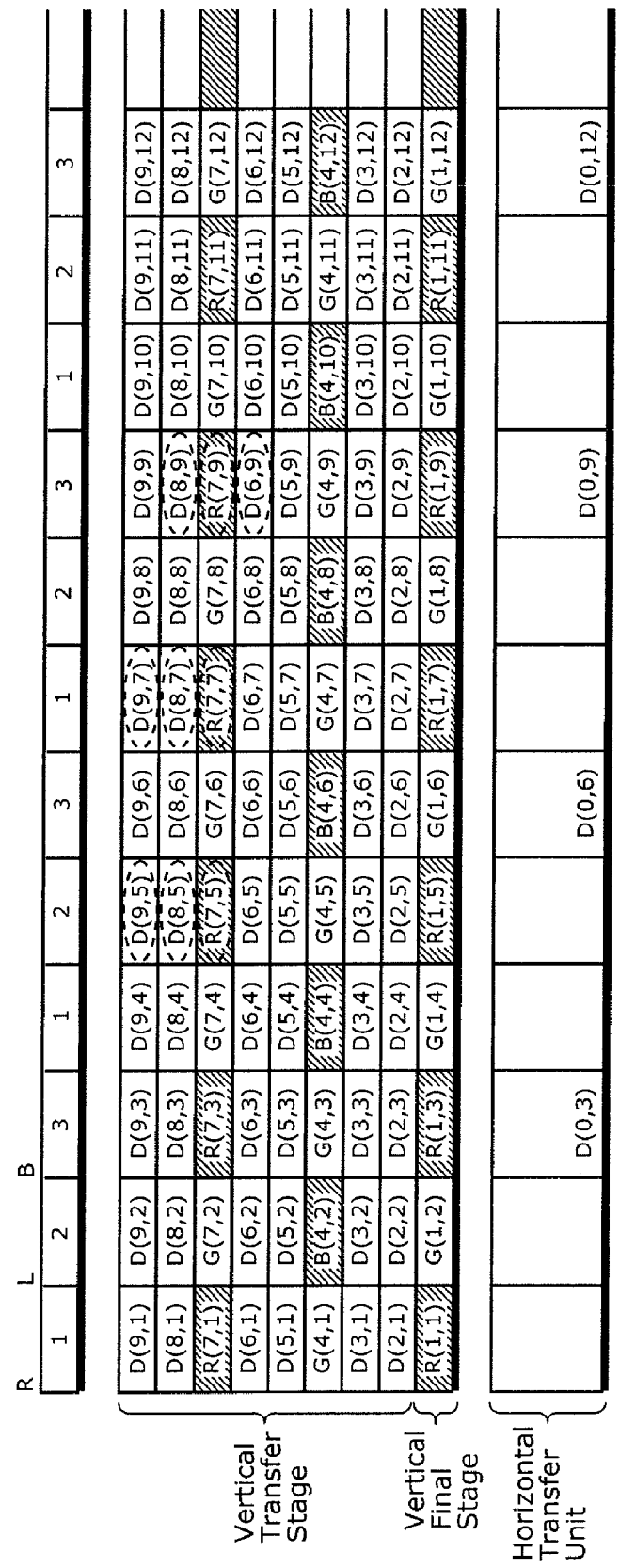
FIG. 2B is a diagram for explaining pixel mixing according to the first embodiment.

In FIG. 2A, 123123 . . . in an upper section represent RLBRLB . . . columns, respectively. In FIG. 2A, only 9 rows×12 columns are shown as a part of the plurality of vertical transfer units 13. R(1, 1) represents a signal packet holding signal charges of a red color pixel positioned in the first row from bottom and the first column from left. D(9, 1) represents a dummy packet which does not have any signal charges of a light-receiving element positioned in the ninth row from bottom and the first column from left. G and B represent a signal packet of a green color pixel and a signal packet of a blue color pixel, respectively. Note that FIGS. 2B to 2N show the coordinates of the original transfer packets of FIG. 2A.

FIG. 2N is a diagram showing a result of the processing, by which charges of three signal packets of the same color in a horizontal direction in FIG. 2A are mixed together in the horizontal transfer unit 14. For example, in FIG. 2A, the three signal packets in a horizontal direction are signal packets R(7, 5), R(7, 7), and R(7, 9), which are surrounded by dashed lines. In FIG. 2N, these three packets are mixed together in the same stage of the horizontal transfer unit 14, as one pixel signal. As shown in FIG. 2N, dummy packets, which exist in the same columns as the columns of the three signal packets (5th, 7th, and 9th columns), are also mixed with the signal packets in the horizontal transfer unit 14.

Figure 3:
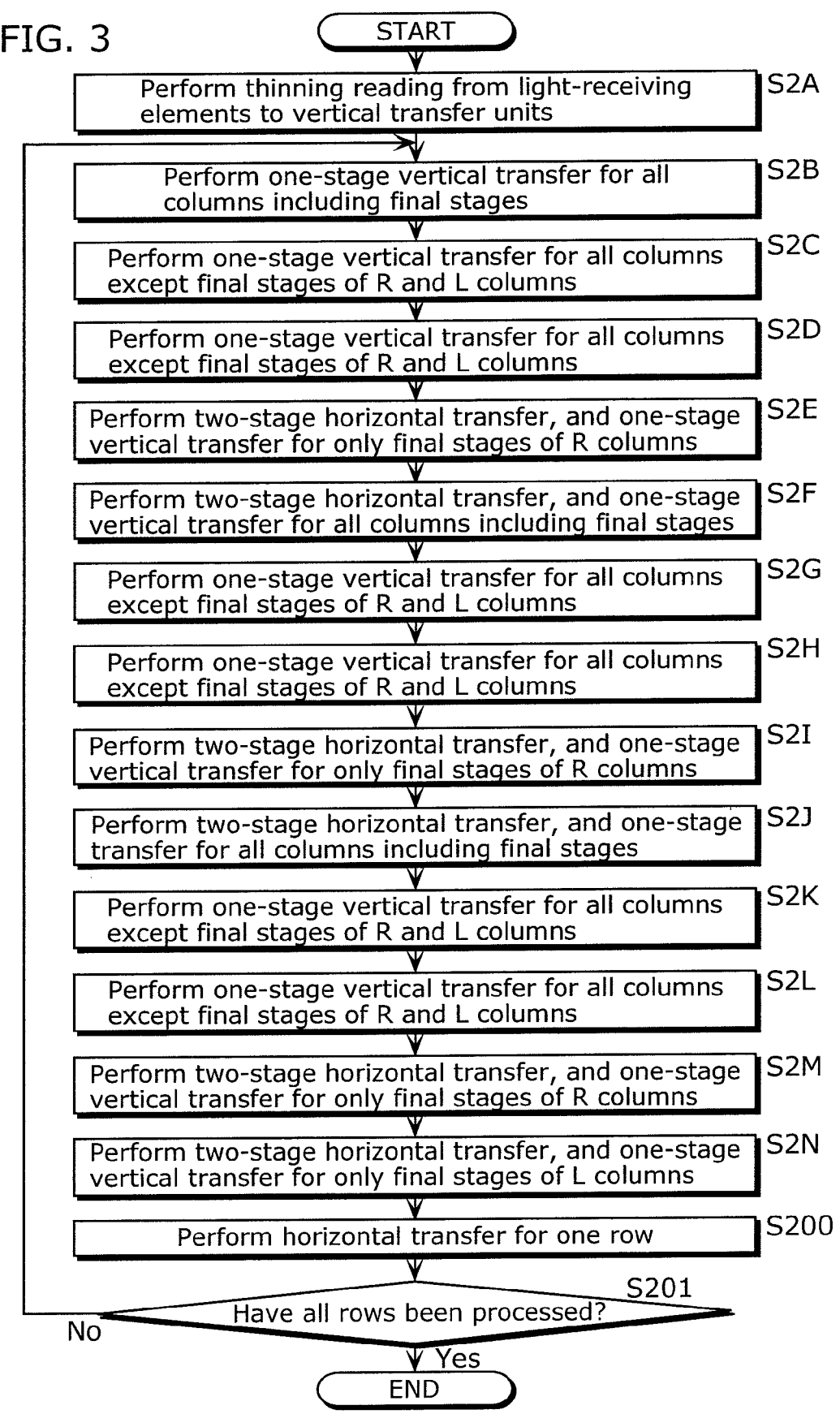
FIG. 3 is a flowchart of driving the pixel mixing according to the first embodiment.

FIG. 3 is a flowchart performed by the timing generation circuit 20 for driving transfer processing of FIGS. 2A to 2N. FIGS. 2A to 2N show respective situations immediately after execution of steps S2A to S2N of FIG. 3.

At step S2A of FIG. 3, the timing generation circuit 20 drives the vertical transfer units 13 to read signal charges from the light-receiving elements 12 in pixels, whose number is reduced or thinned (hereinafter, expressed as "perform thinning reading"), to the vertical transfer units 13. The result is shown in FIG. 2A. Note that dummy packets D(0, 3), D(0, 6), and the like in the 0th row are dummy signals read from optical black pixels or dummy pixels.

The figures show such 0th-row dummy packets only for B columns.

At step S2B, the timing generation circuit 20 drives the vertical transfer units 13 to transfer packets by one stage in a vertical direction (hereinafter, expressed as "perform one-stage vertical transfer) for all R, L, and B columns including vertical final stages (final stages). As another example, the timing generation circuit 20 may drive the vertical transfer units 13 to perform one-stage vertical transfer for all columns except final stages of R and L columns. The result is shown in FIG. 2B. In FIGS. 2B to 2N, the horizontal transfer unit 14 and packets held therein are shown in a lower section. In FIG. 2B, only dummy packets in the 0th row of B columns are transferred to the horizontal transfer unit 14.

Figure 2C:
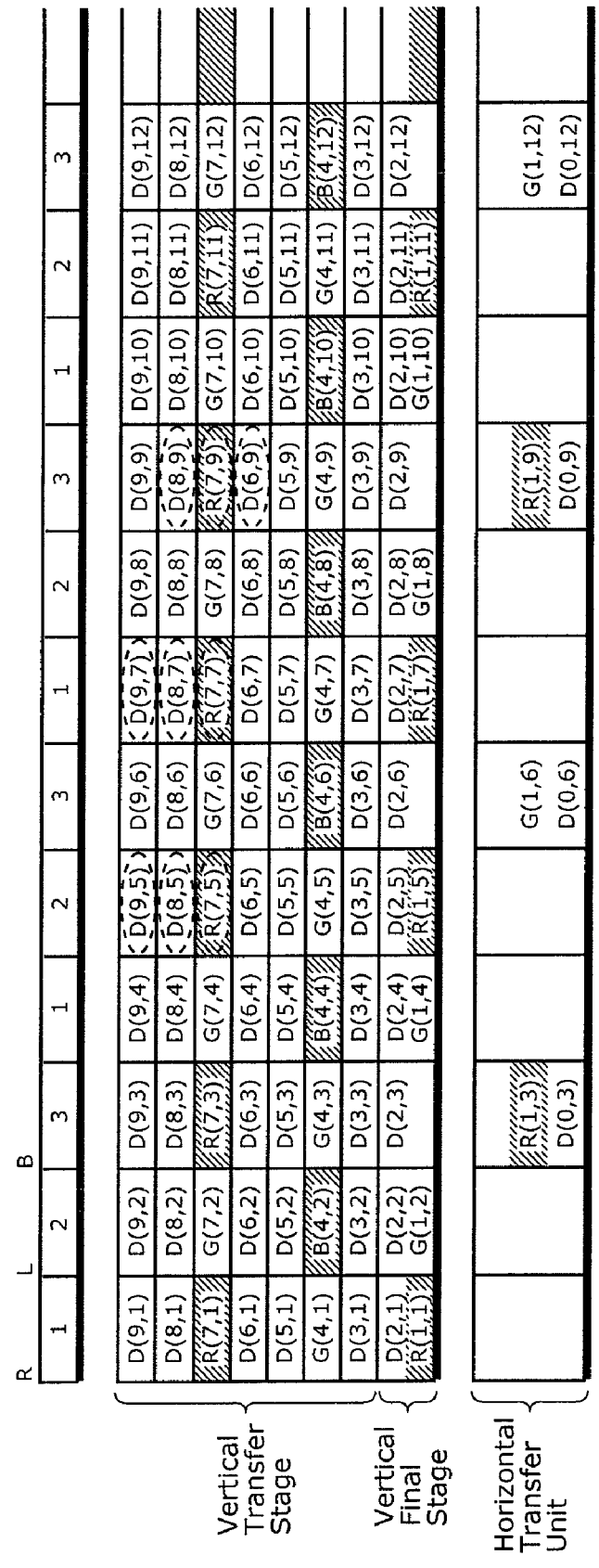
FIG. 2C is a diagram for explaining pixel mixing according to the first embodiment.

At step S2C, the timing generation circuit 20 drives the vertical transfer units 13 to perform one-stage vertical transfer for all columns except final stages of R and L columns. As a result, in each B column, a packet in the final stages is transferred to the horizontal transfer unit 14, and in each final stage of R and L columns, a transferred packet is vertically added to a remaining packet in the final stage. The result is shown in FIG. 2C.

Figure 2D:
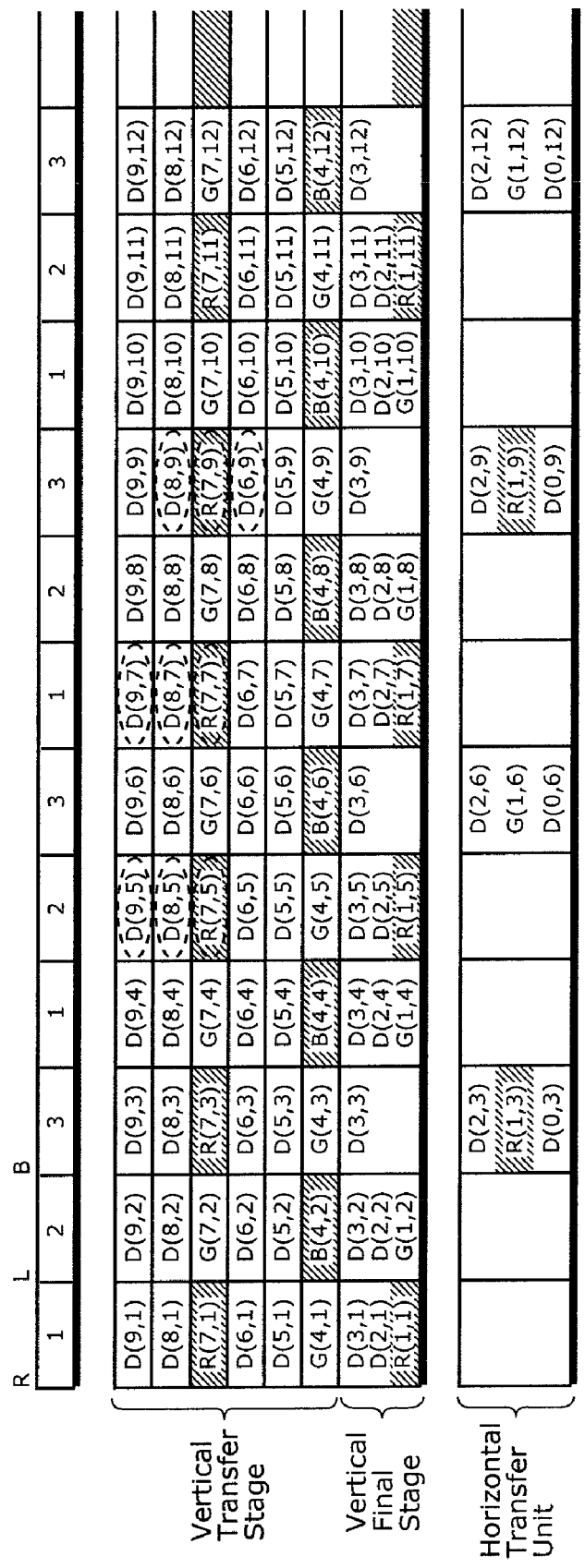
FIG. 2D is a diagram for explaining pixel mixing according to the first embodiment.

At step S2D, the timing generation circuit 20 drives the vertical transfer units 13 to perform one-stage vertical transfer for all RLB columns except final stages of R and L columns. As a result, in each B column, a packet in the final stages is transferred to the horizontal transfer unit 14, and in each final stage of R and L columns, a transferred packet is vertically added to remaining packets in the final stage. The result is shown in FIG. 2D.

Figure 2E:
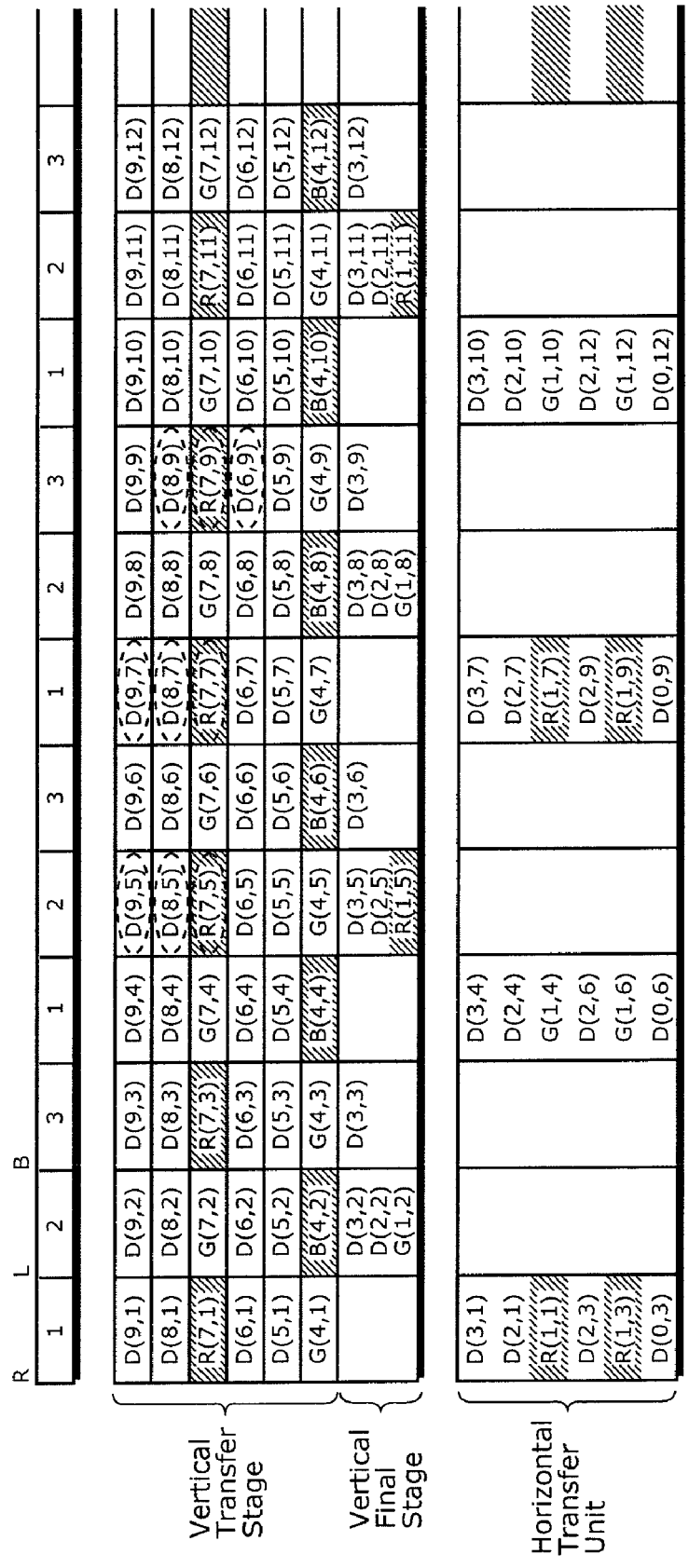
FIG. 2E is a diagram for explaining pixel mixing according to the first embodiment.

At step S2E, the timing generation circuit 20 drives the horizontal transfer unit 14 to transfer packets by two stages in a horizontal direction (hereinafter, expressed as "perform two-stage horizontal transfer), and then drives the vertical transfer unit 13 to perform one-stage vertical transfer for final stages of R columns. The result is shown in FIG. 2E.

Figure 2F:
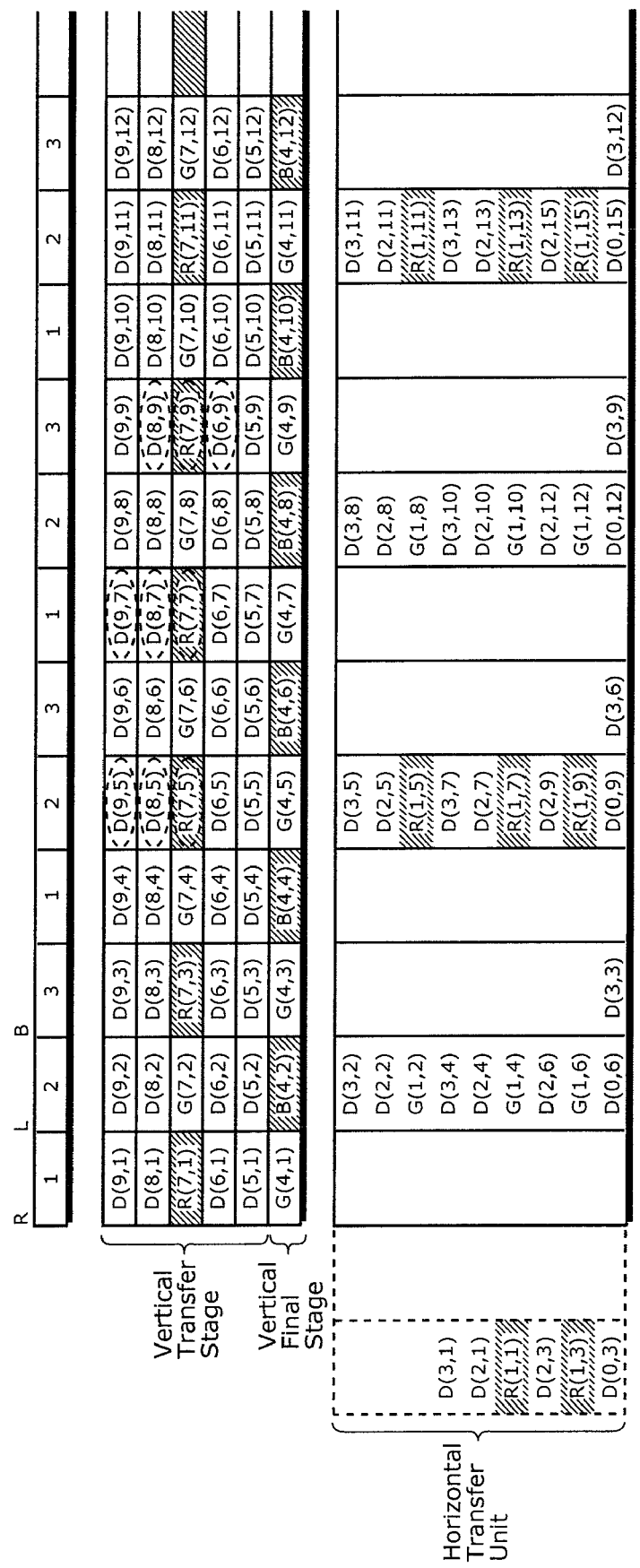
FIG. 2F is a diagram for explaining pixel mixing according to the first embodiment.

At step S2F, the timing generation circuit 20 drives the horizontal transfer unit 14 to perform two-stage horizontal transfer, and then drives the vertical transfer unit 13 to perform one-stage transfer for all columns including final stages. As another example, the timing generation circuit 20 may drive the vertical transfer unit 13 to perform one-stage vertical transfer for all columns except final stages of R columns, after the driving of the horizontal transfer unit 14. The result is shown in FIG. 2F.

Figure 2G:
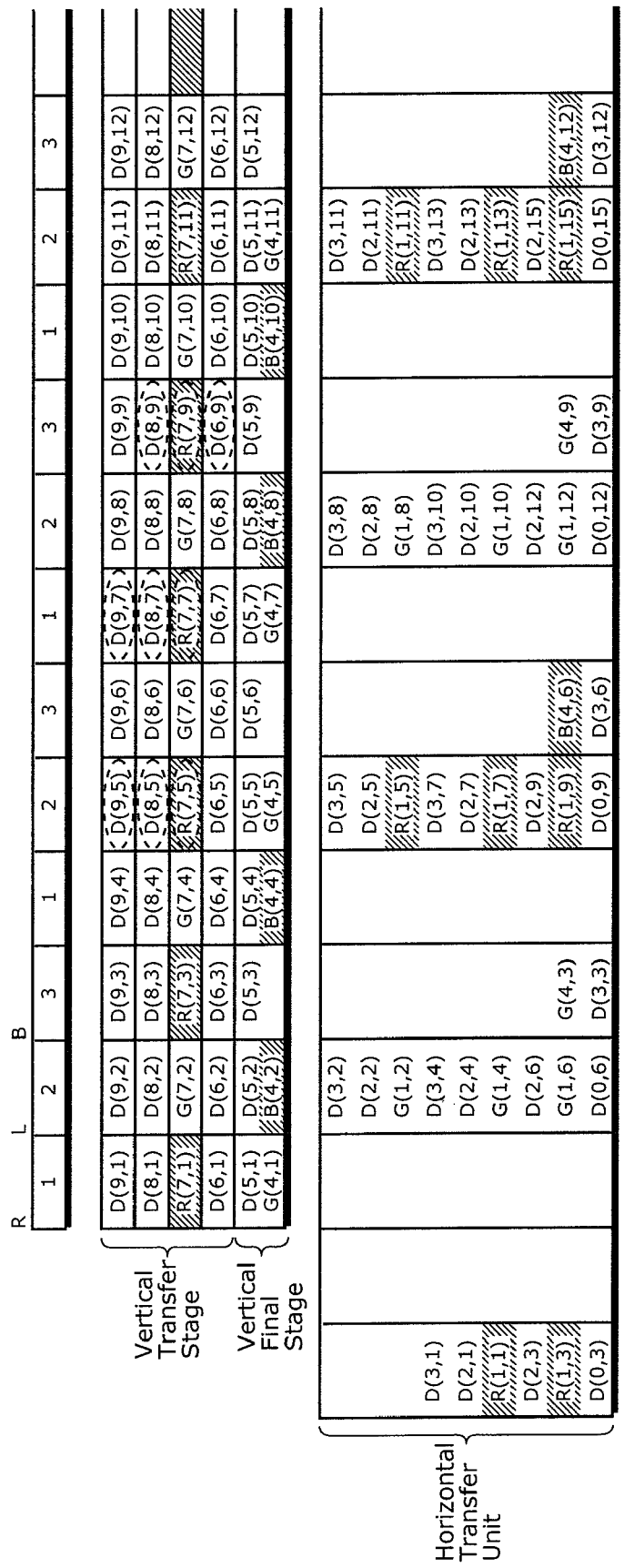
FIG. 2G is a diagram for explaining pixel mixing according to the first embodiment.

At step S2G, the timing generation circuit 20 drives the horizontal transfer unit 14 to perform one-stage transfer for all columns except final stages of R and L columns. As a result, in each final stage of R and L columns, a transferred packet is vertically added to a remaining packet s in the final stage. The result is shown in FIG. 2G.

Figure 2H:
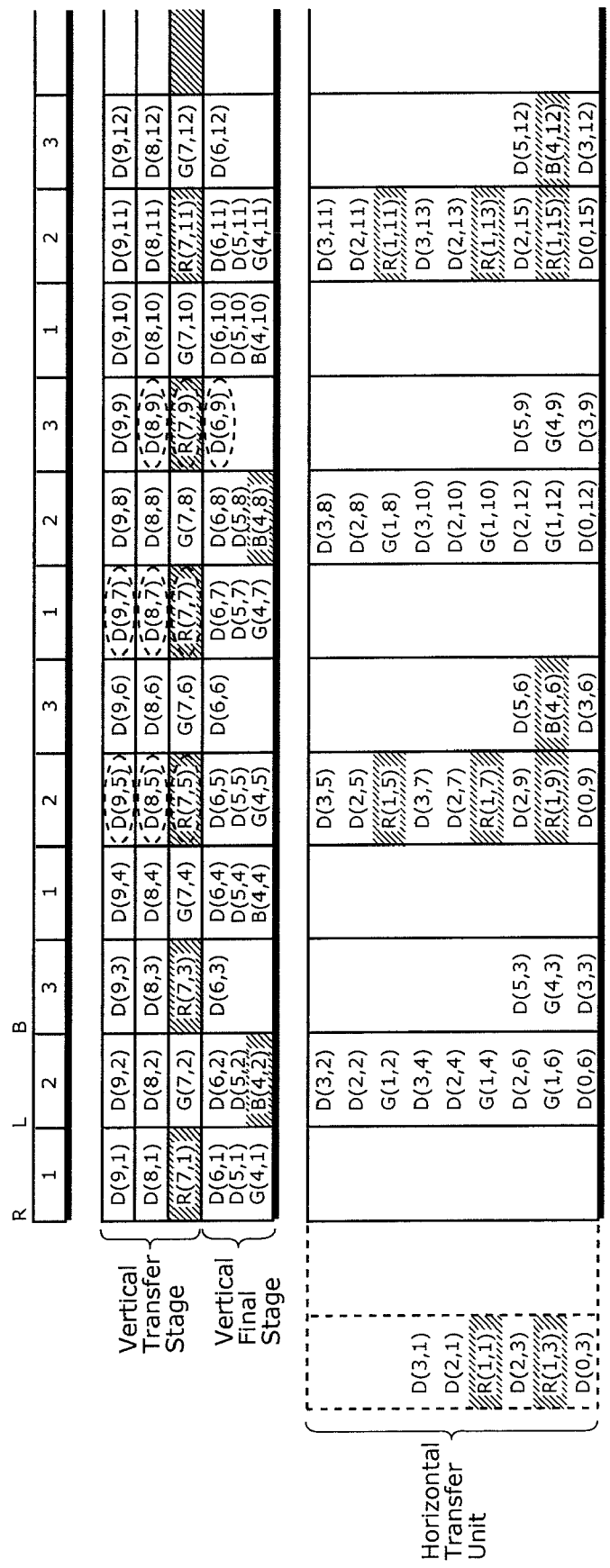
FIG. 2H is a diagram for explaining pixel mixing according to the first embodiment.

At step S2H, the timing generation circuit 20 drives the vertical transfer unit 13 to perform one-stage transfer for all columns except final stages of R and L columns. As a result, in each final stage of R and L columns, a transferred packet is added to remaining packets in the final stage. The result is shown in FIG. 2H.

Figure 2I:
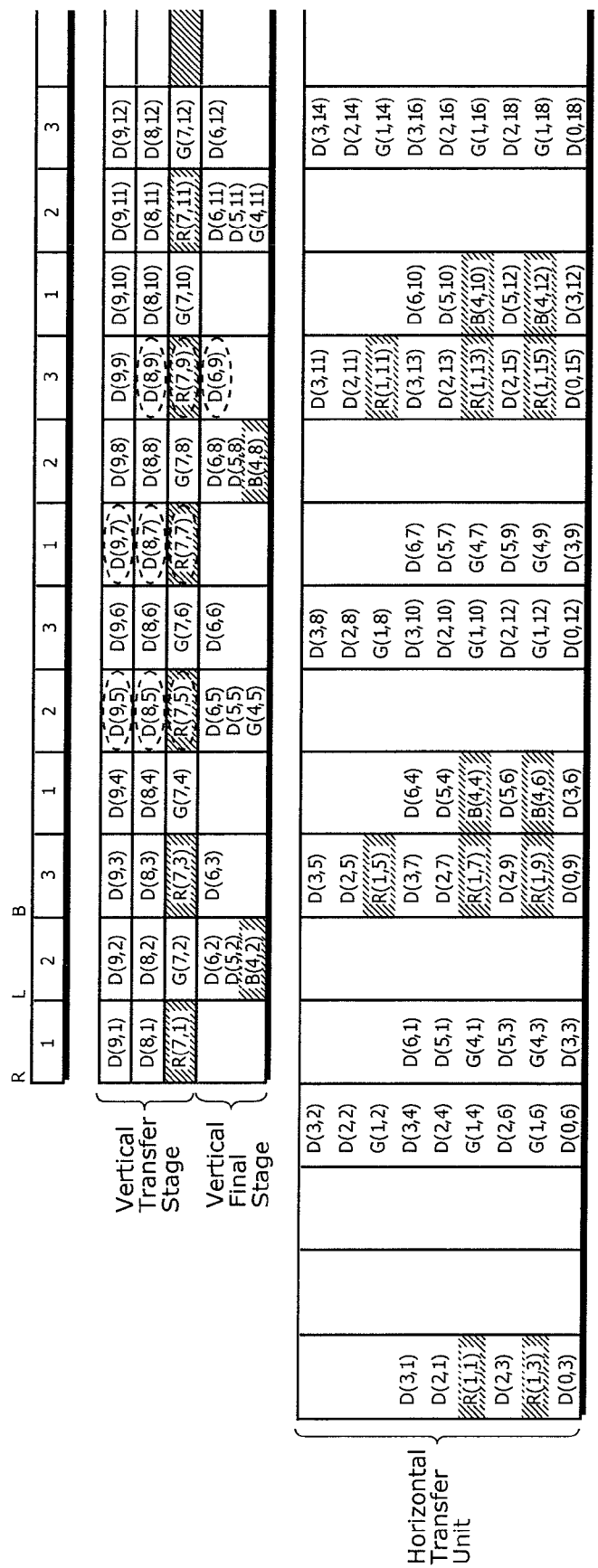
FIG. 2I is a diagram for explaining pixel mixing according to the first embodiment.
Figure 2J:
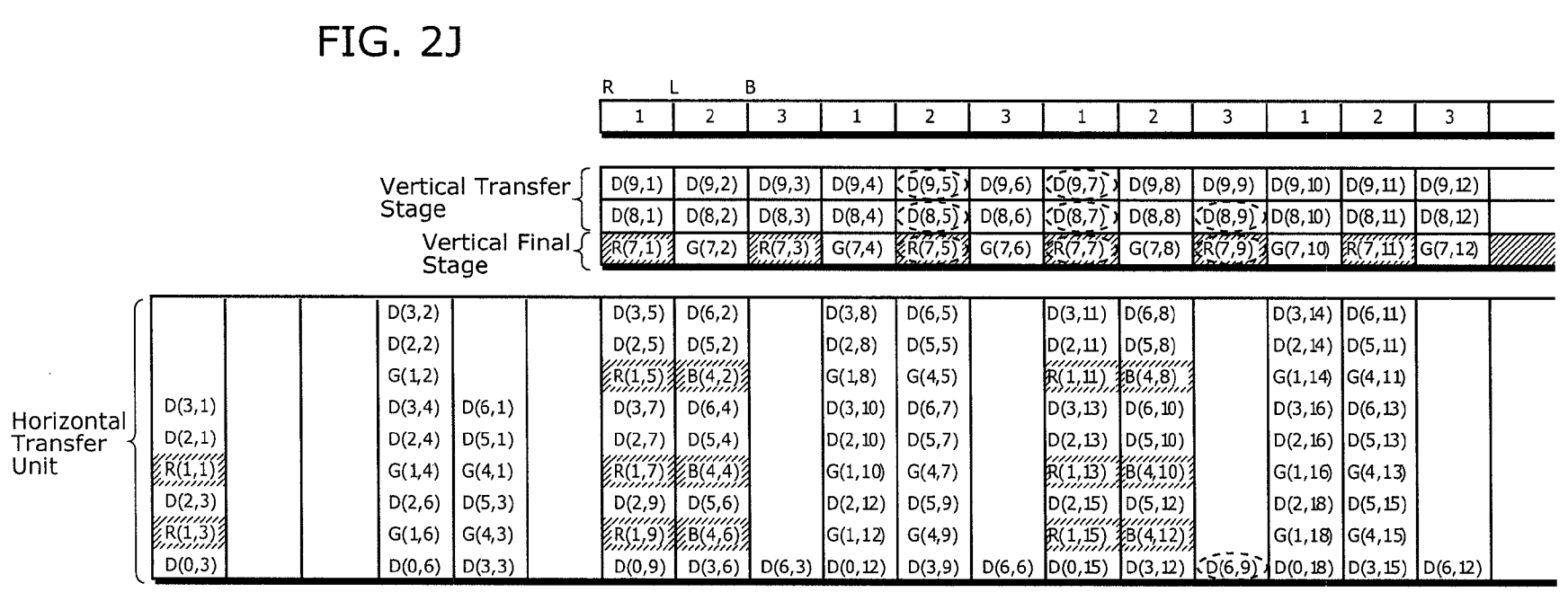

At step S2J, the timing generation circuit 20 drives the horizontal transfer unit 14 to perform two-stage horizontal transfer, and then drives the vertical transfer unit 13 to perform one-stage transfer for only final stages of R columns. The result is shown in FIG. 2I.

Figure 2K:
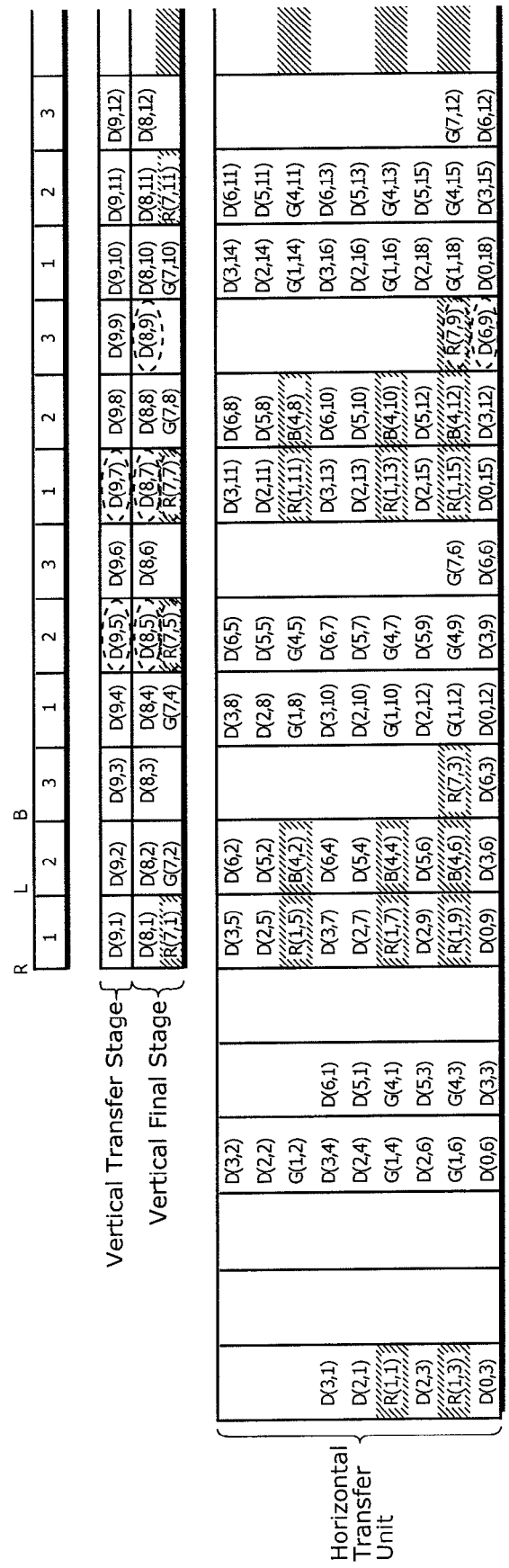
FIG. 2K is a diagram for explaining pixel mixing according to the first embodiment.

At step S2K, the timing generation circuit 20 drives the horizontal transfer unit 14 to perform two-stage horizontal transfer, and then drives the vertical transfer unit 13 to perform one-stage transfer for all columns including final stages. As another example, the timing generation circuit 20 may drive the vertical transfer unit 13 to perform one-stage vertical transfer for all columns except final stages of R columns, after the driving of the horizontal transfer unit 14. The result is shown in FIG. 2K.

At step S2K, the timing generation circuit 20 drives the vertical transfer unit 13 to perform one-stage transfer for all columns except final stages of R and L columns. The result is shown in FIG. 2K.

At step S2L, the timing generation circuit 20 drives the vertical transfer unit 13 to perform one-stage transfer for all columns except final stages of R and L columns.

Figure 2L:
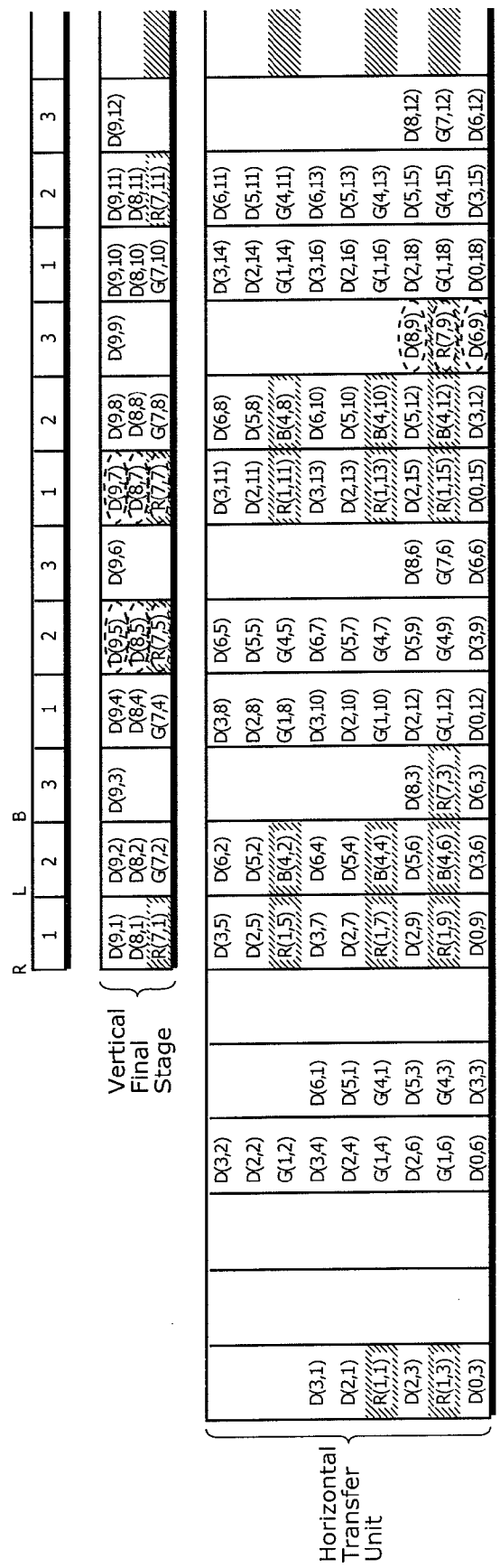
FIG. 2L is a diagram for explaining pixel mixing according to the first embodiment.

The result is shown in FIG. 2L.

Figure 2M:
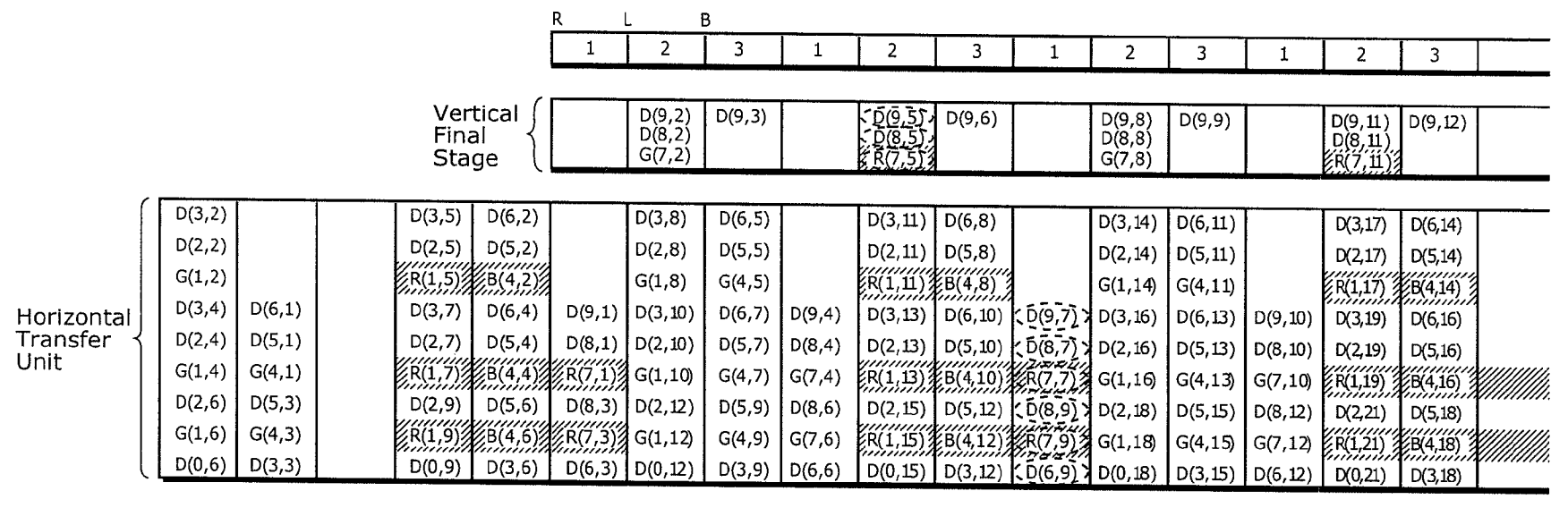

At step S2M, the timing generation circuit 20 drives the horizontal transfer unit 14 to perform two-stage horizontal transfer, and then drives the vertical transfer unit 13 to perform one-stage transfer for only final stages of R columns. The result is shown in FIG. 2M.

At step S2N, the timing generation circuit 20 drives the horizontal transfer unit 14 to perform two-stage horizontal transfer, and then drives the vertical transfer unit 13 to perform one-stage transfer for only final stages of L columns. The result is shown in FIG. 2N as described previously. As shown in FIG. 2N, three signal packets of the same color and a plurality of dummy packets neighboring the respective signal packets in the identical column are mixed in the same stage of the horizontal transfer unit 14.

Then, at Step S200, the timing generation circuit 20 drives the horizontal transfer unit 14 to sequentially transfer pixel charges per row. At step S201, it is determined whether or not there is any signal packet in the vertical transfer unit 13 which has not yet been transferred. If the determination is made that there is no such a signal packet (Yes at S201), then the processing is complete. On the other hand, if there is any such a signal packet (No at S201), then the processing returns to step S2B to repeat the above-explained processing. Here, the determination at step S201 may be made as to whether a predetermined number of rows have been transferred.

As described above, the solid-state imaging device according to the first embodiment includes a plurality of light-receiving elements which are arranged by rows and columns; a plurality of vertical transfer units each of which is arranged for a corresponding column of the light-receiving elements, and is operable to vertically transfer a plurality of signal packets and dummy packets in a moving picture imaging mode, the signal packet including charges read from the light-receiving elements which are thinned, the dummy packets being packets other than the signal packets, and N columns of the vertical transfer units forming one column group; a plurality of hold units which are arranged for final stages of the vertical transfer units in N columns except M column in the column group, and each of which is operable to mix, hold, and vertically transfer charges of the signal packets and the dummy packet without depending on vertical transfer from upstream of the corresponding vertical transfer unit; a horizontal transfer unit operable to mix, hold, and horizontally transfer the charges transferred from the hold units or the vertical transfer units in the M column in the column group; and a driving unit operable to drive the vertical transfer units, the hold units, and the horizontal transfer unit, wherein the driving unit perform the driving, so that, in the moving picture imaging mode, a signal packet and a plurality of dummy packets in an identical column are mixed together into a mixed packet in each of the holding units, charges of the mixed packet are held in the hold unit, the held charges of the mixed packet are vertically transferred to the horizontal transfer unit so that the mixed packet is mixed with a mixed packet of a different hold unit which is vertically transferred from the different hold unit to the horizontal transfer unit.

The 0th-row dummy packets exist only in B columns, because the B columns do not have any hold units. As shown in FIGS. 2A to 2N, in R and L columns, packets are transferred to the horizontal transfer unit 14 in an order of a signal packet, a dummy packet, and a dummy packet. However, in B columns, packets are transferred to the horizontal transfer unit 14 in an order of a dummy packet, a signal packet, and a dummy packet. That is, in B columns, a signal packet is mixed with dummy packets prior and subsequent to the signal packet.

If all columns have hold units, a signal packet and dummy packets are mixed together in vertical transfer stages of all columns, so that transfer processing is different from the above-described processing. The above-described processing is resulted from that, in the columns without holding units, it is not possible to mix packets in a vertical direction in a vertical final stage.

However, if all columns have hold units, it is necessary to increase the number of terminals and control signals for driving the hold units independently, which results in cost increase due to chip area increase of a solid-state imaging device and a control IC. However, according to the driving method of the present invention, transfer processing is irregular depending on columns, which makes it possible to completely correspond a column of dummy packets to a column of a signal packet. As a result, image quality is improved.

In the solid-state imaging device, the hold units are the final transfer stages of the vertical transfer units in N columns except M column in the column group, and have independent transfer electrodes. As described above, by forming independent transfer electrodes in final transfer stages of the vertical transfer units in columns each of which is in N columns except M columns in each column group, and driving the electrodes independently, it is possible to realize the above mixing processing in order to prevent smear aliasing.

Note that, although it has been described that the three transfer packets include one signal packet and two dummy packets, the structure is not limited to the above. Note also that a person having ordinary skill in the art can easily modify the gate structure in one transfer packet, as far as the number of the gates is equal to or more than three gates, in order to realize the above driving.

Second Embodiment

The following describes a solid-stage imaging device according to the second embodiment. According to the second embodiment, any final stages of the vertical transfer units 13 do not have independent transfer electrodes. In addition, the hold units in the first embodiment are replaced to hold units which are formed between the horizontal transfer unit 14 and respective vertical transfer units 13 in predetermined columns. Here, each of the predetermined columns is a column in N columns except M columns (where M is 1, for example) in each column group. The column group has N columns and such a column group is repeated in a horizontal direction. As a result, the hold units hold and transfer charges independently in every N other columns.

Figure 4:
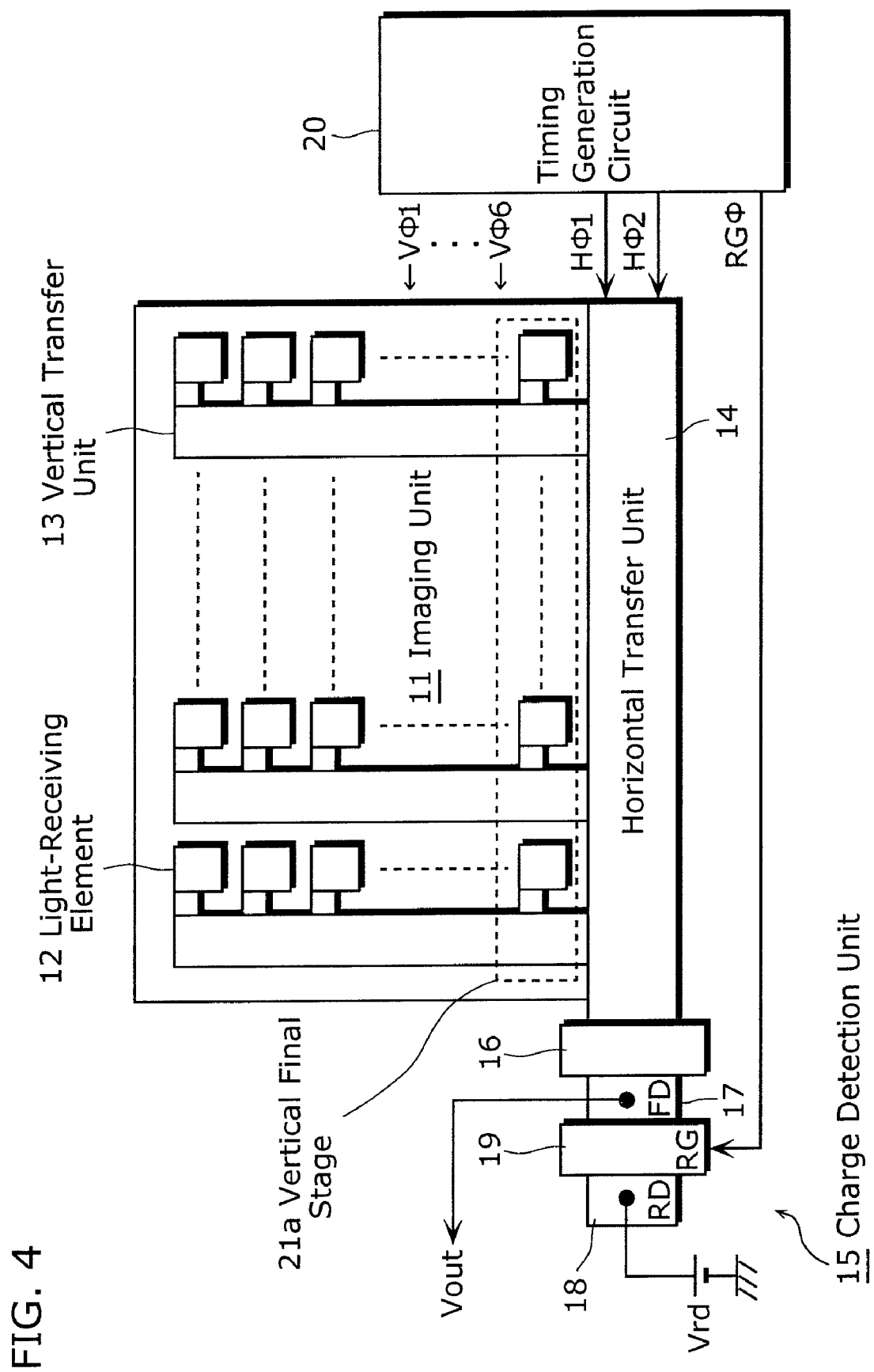
FIG. 4 is a block diagram showing a structure of a solid-state imaging device according to the second embodiment of the present invention.

FIG. 4 is a block diagram showing a structure of the solid-state imaging device according to the second embodiment of the present invention. The structure of FIG. 4 differs from the structure of FIG. 1 in that the final stages 21 of all vertical transfer units 13 do not have any independent transfer electrodes, and that a plurality of hold units 21a are added. The reference numerals in FIG. 1 are assigned to the same units of FIG. 4, so that the details of the units are not described again and the following described mainly the difference.

Each of the hold units 21a is formed between the horizontal transfer unit 14 and each of the vertical transfer units 13 in predetermined columns. Each of the predetermined columns is a column in N columns except M columns in each column group. The column group has N columns and such a column group is repeated in a horizontal direction. As a result, the hold units 21 hold and transfer charges independently in every N other columns. The hold units 21a have the almost same function as the final stages 21 of FIG. 1.

The timing generation circuit 20 drives a plurality of the hold units 21a, as well as a plurality of the vertical transfer units 13 and the horizontal transfer unit 14. More specifically, the timing generation circuit 20 drives the horizontal transfer unit 14 and the hold units 21a, so that, in the moving picture imaging mode, a signal packet and dummy packets in the identical column are mixed into one packet in each hold unit 21a, then charges in the mixed packet are held in the hold unit 21a, and the mixed packet is mixed in the horizontal transfer unit 14 with other mixed packets of the same color which have been in other hold units 21a.

The following describes processing performed by the solid-state imaging device having the above-described structure according to the second embodiment.

Figure 5A:
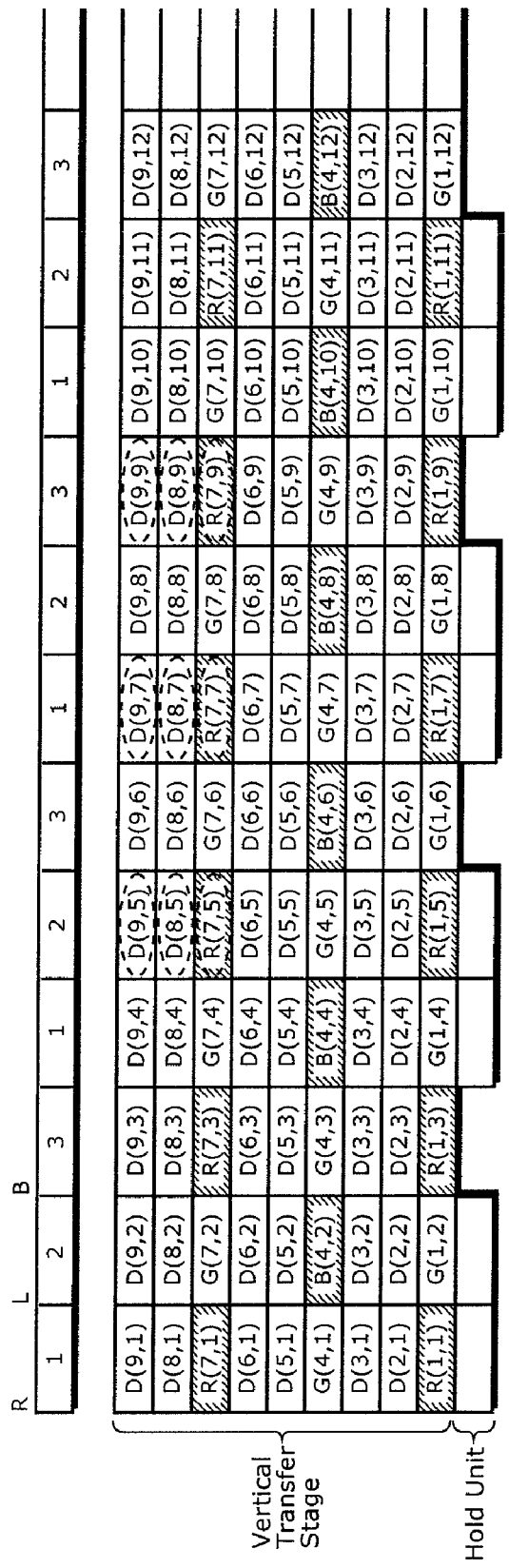
FIG. 5A is a diagram for explaining pixel mixing according to the second embodiment.

FIGS. 5A to 5P are diagrams showing, as one example, how signal packets and dummy packets are transferred and mixed in the moving picture imaging mode. Here, it is assumed that, in thinning reading, charges of three pixels in a vertical direction are mixed as one transfer packet.

In FIG. 5A, 123123 . . . in an upper section represent RLBRLB . . . columns, respectively.

Figure 5B:
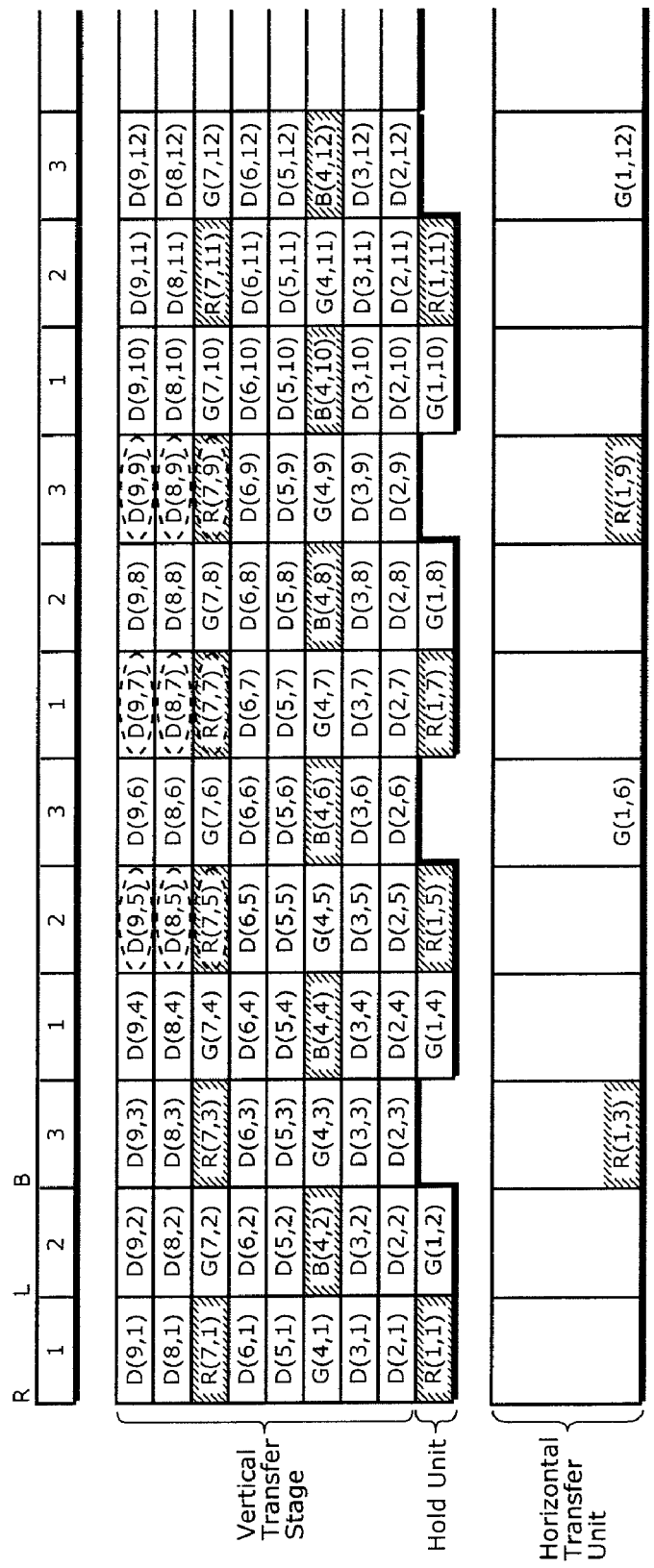
FIG. 5B is a diagram for explaining pixel mixing according to the second embodiment.

In FIG. 5A, only 9 rows×12 columns are shown as a part of the plurality of vertical transfer units 13. The hold units 21a are also shown with the vertical transfer units 13. Note that FIGS. 5B to 5P show the coordinates of the original transfer packets of FIG. 5A.

FIG. 5P is a diagram showing a result of the processing, by which charges of three signal packets of the same color in a horizontal direction in FIG. 5A are mixed together in the horizontal transfer unit 14. For example, in FIG. 5A, the three signal packets in a horizontal direction are signal packets R(7, 5), R(7, 7), and R(7, 9), which are surrounded by dashed lines. In FIG. 5P, these three packets are mixed together in the same stage of the horizontal transfer unit 14, as one pixel signal. As shown in FIG. 5P, dummy packets, which exist in the same columns as the columns of the three signal packets (5th, 7th, and 9th columns), are also mixed with the signal packets in the horizontal transfer unit 14.

Figure 6:
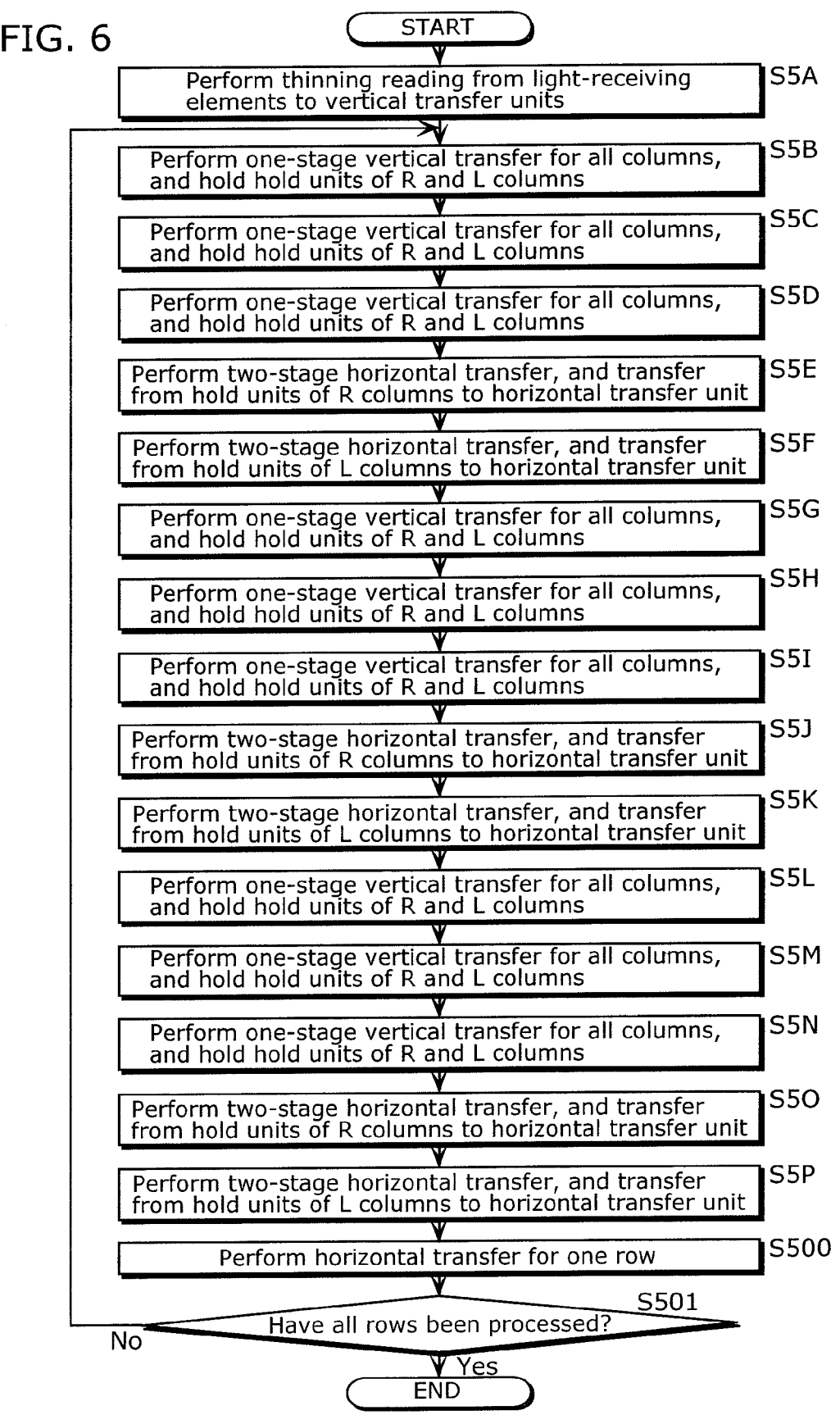
FIG. 6 is a flowchart of driving the pixel mixing according to the second embodiment.

FIG. 6 is a flowchart performed by the timing generation circuit 20 for driving transfer processing of FIGS. 5A to 5P. FIGS. 5A to 5P show respective situations immediately after execution of steps S5A to S5P of FIG. 6.

At step S5A of FIG. 6, the timing generation circuit 20 drives the vertical transfer units 13 to perform thinning reading from the light-receiving elements 12 to the vertical transfer units 13. The result is shown in FIG. 2A. In this situation, the hold units 21a are still empty.

At step S5B, the timing generation circuit 20 drives the vertical transfer units 13 to perform one-stage vertical transfer for all columns, and drives the hold units 21a of R and L columns to be hold state. The hold state means a situation where the hold units can obtain packets from the vertical transfer units 13 and hold the packets. The result is shown in FIG. 5B.

Figure 5C:
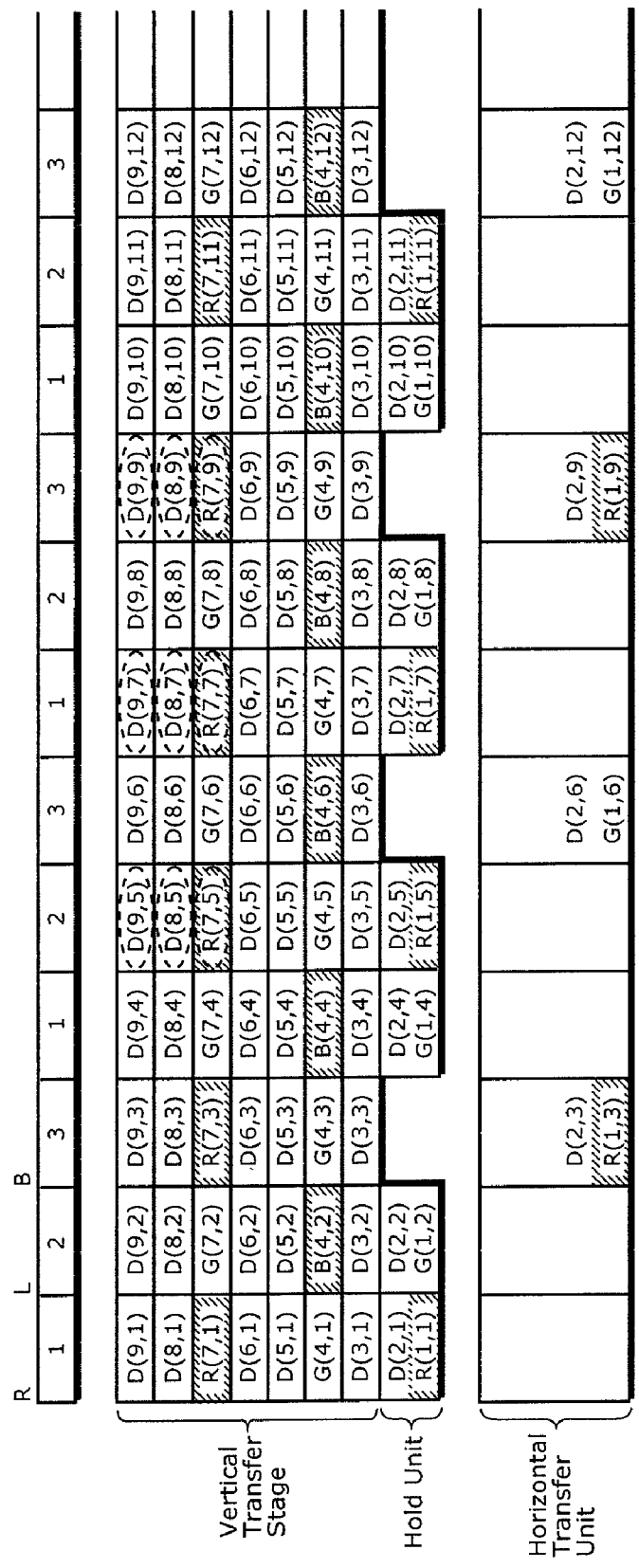
FIG. 5C is a diagram for explaining pixel mixing according to the second embodiment.

At step S5C, the timing generation circuit 20 drives the vertical transfer units 13 to perform one-stage vertical transfer for all columns, and drives the hold units 21a of R and L columns to be hold state. Thereby, each of the hold units 21a mixes a packet transferred from the vertical transfer unit 13 with a packet held in the hold unit. The result is shown in FIG. 5C.

Figure 5D:
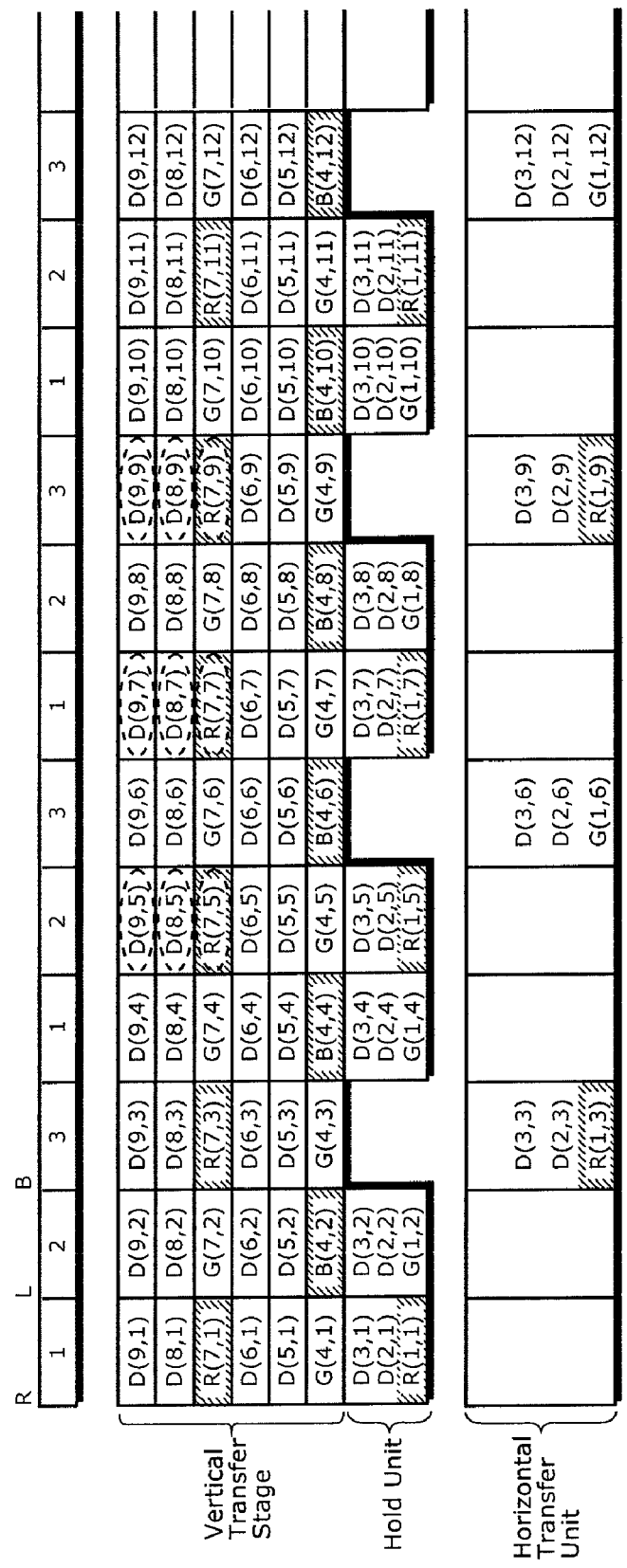
FIG. 5D is a diagram for explaining pixel mixing according to the second embodiment.

At step S5D, the timing generation circuit 20 drives the vertical transfer units 13 to perform one-stage vertical transfer for all columns, and drives the hold units 21a of R and L columns to be hold state. Thereby, each of the hold units 21a mixes a packet transferred from the vertical transfer unit 13 with packets held in the hold unit. The result is shown in FIG. 5D.

Figure 5E:
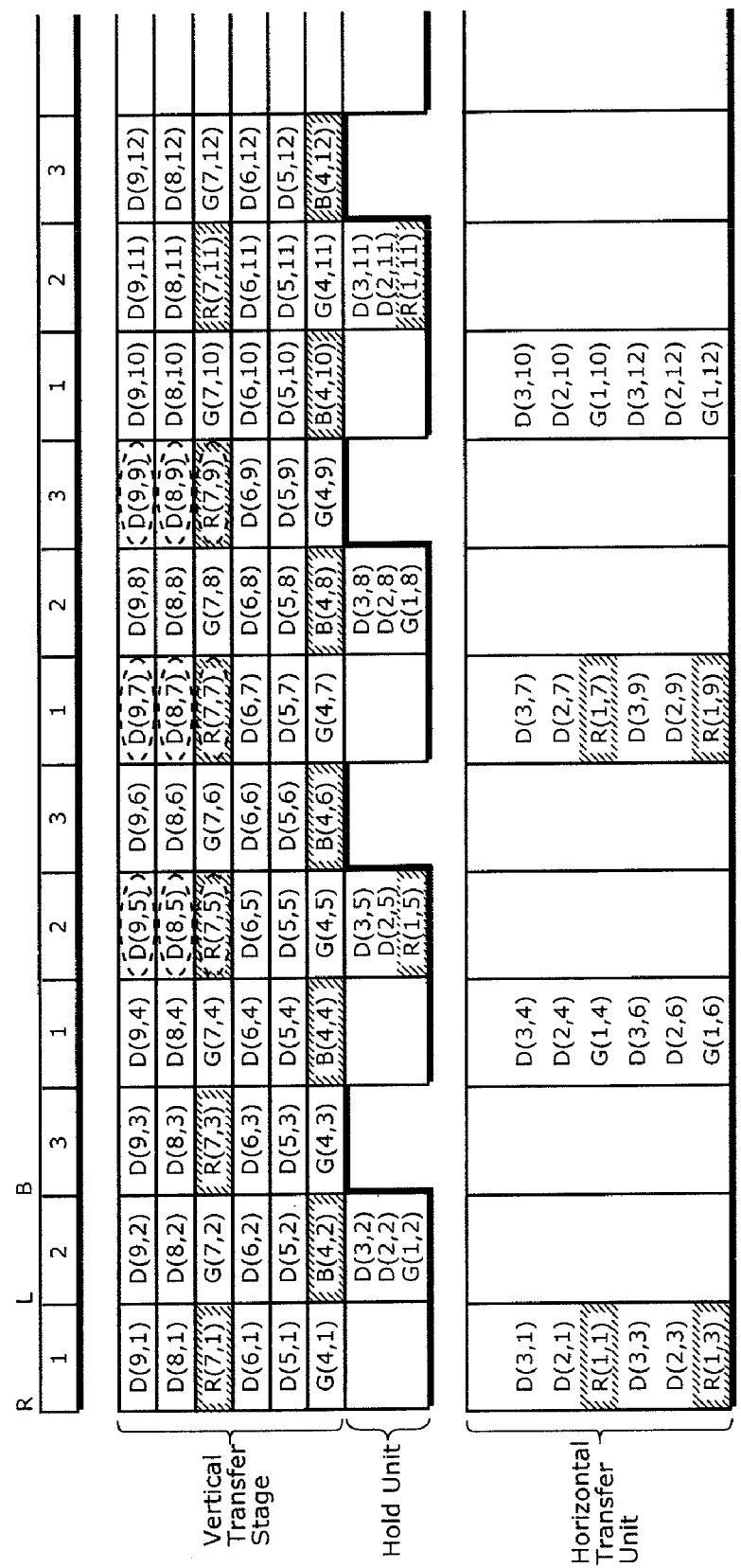
FIG. 5E is a diagram for explaining pixel mixing according to the second embodiment.

At step S5E, the timing generation circuit 20 drives the horizontal transfer unit 14 to perform two-stage horizontal transfer, and then drives the hold units 21a of R columns to transfer the mixed packets to the horizontal transfer unit 14. The result is shown in FIG. 5E.

Figure 5F:
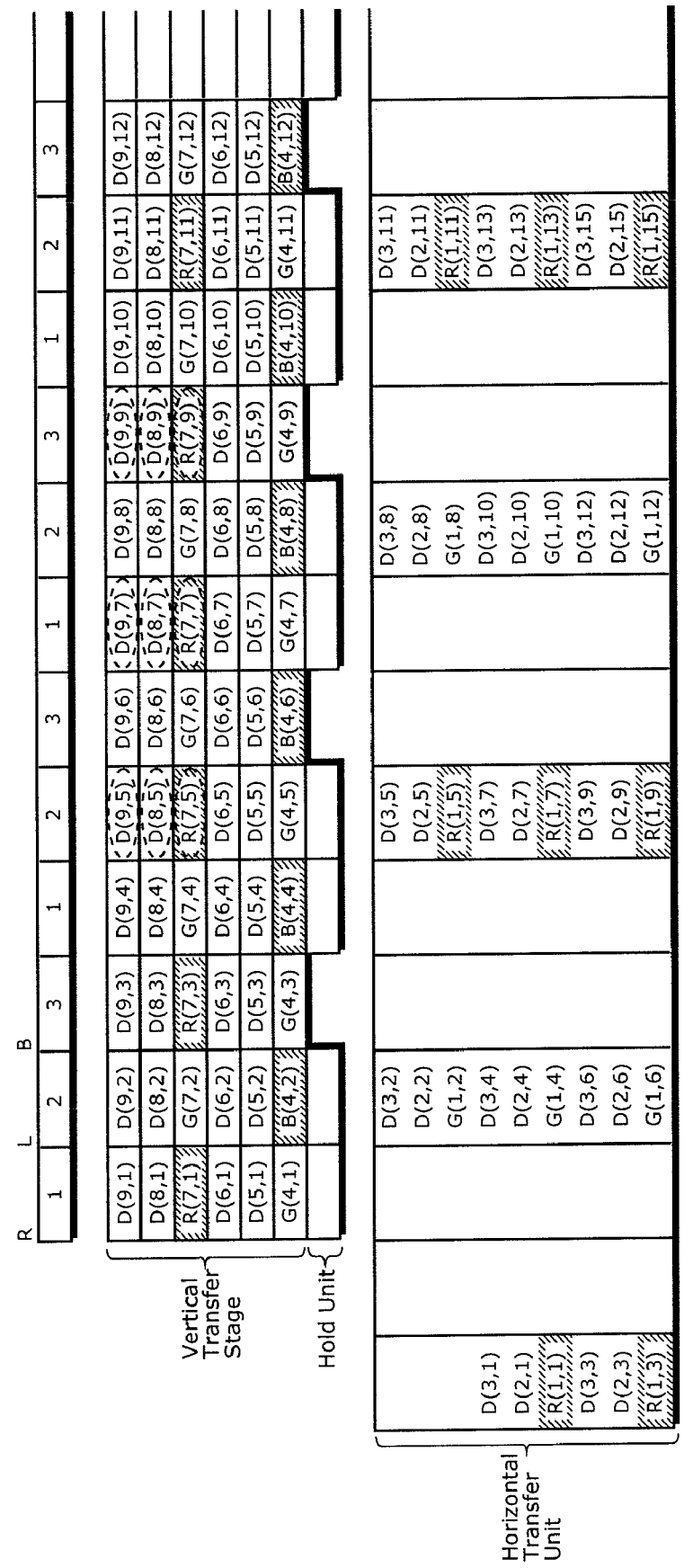
FIG. 5F is a diagram for explaining pixel mixing according to the second embodiment.

At step S5F, the timing generation circuit 20 drives the horizontal transfer unit 14 to perform two-stage horizontal transfer, and then drives the hold units 21a of L columns to transfer the mixed packets to the horizontal transfer unit 14. The result is shown in FIG. 5F.

Figure 5G:
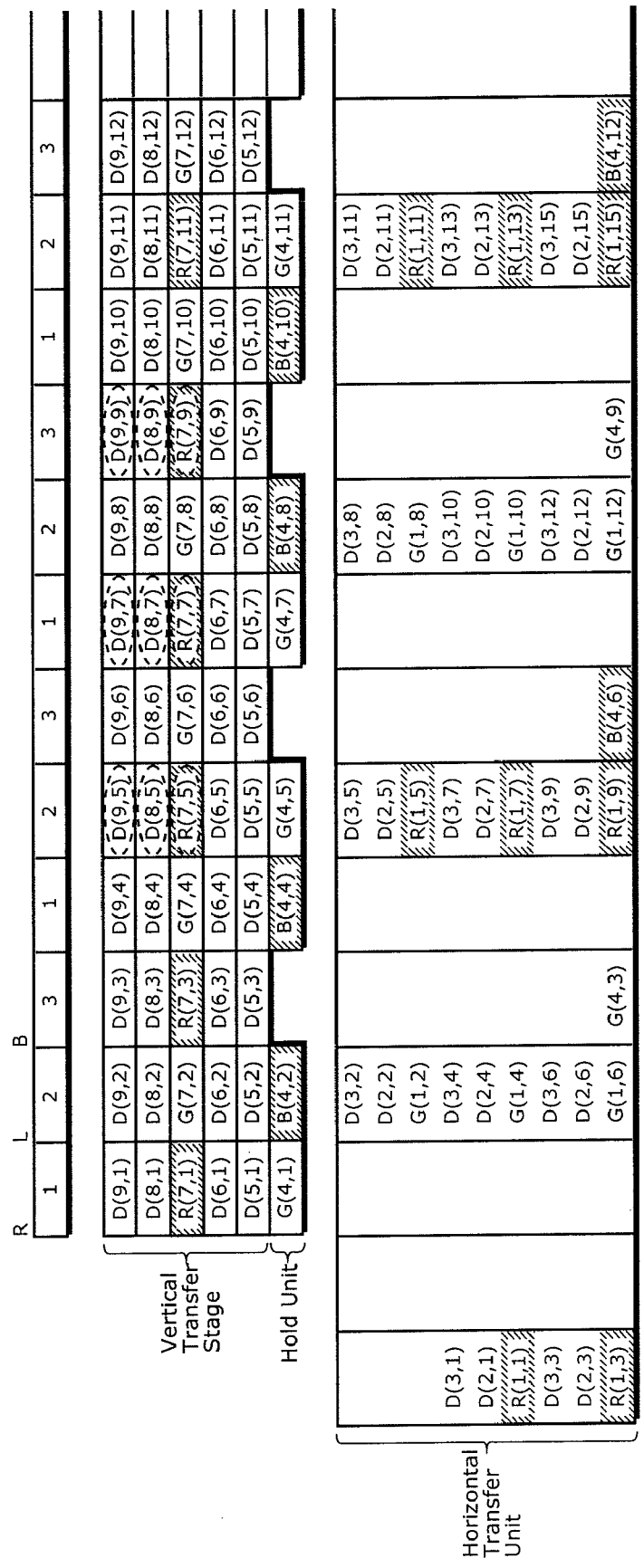
FIG. 5G is a diagram for explaining pixel mixing according to the second embodiment.

At step S5G, the timing generation circuit 20 drives the vertical transfer units 13 to perform one-stage vertical transfer for all columns, and drives the hold units 21a of R and L columns to be hold state. Thereby, each of the hold units 21a holds a packet transferred from the vertical transfer unit 13. The result is shown in FIG. 5G.

Figure 5H:
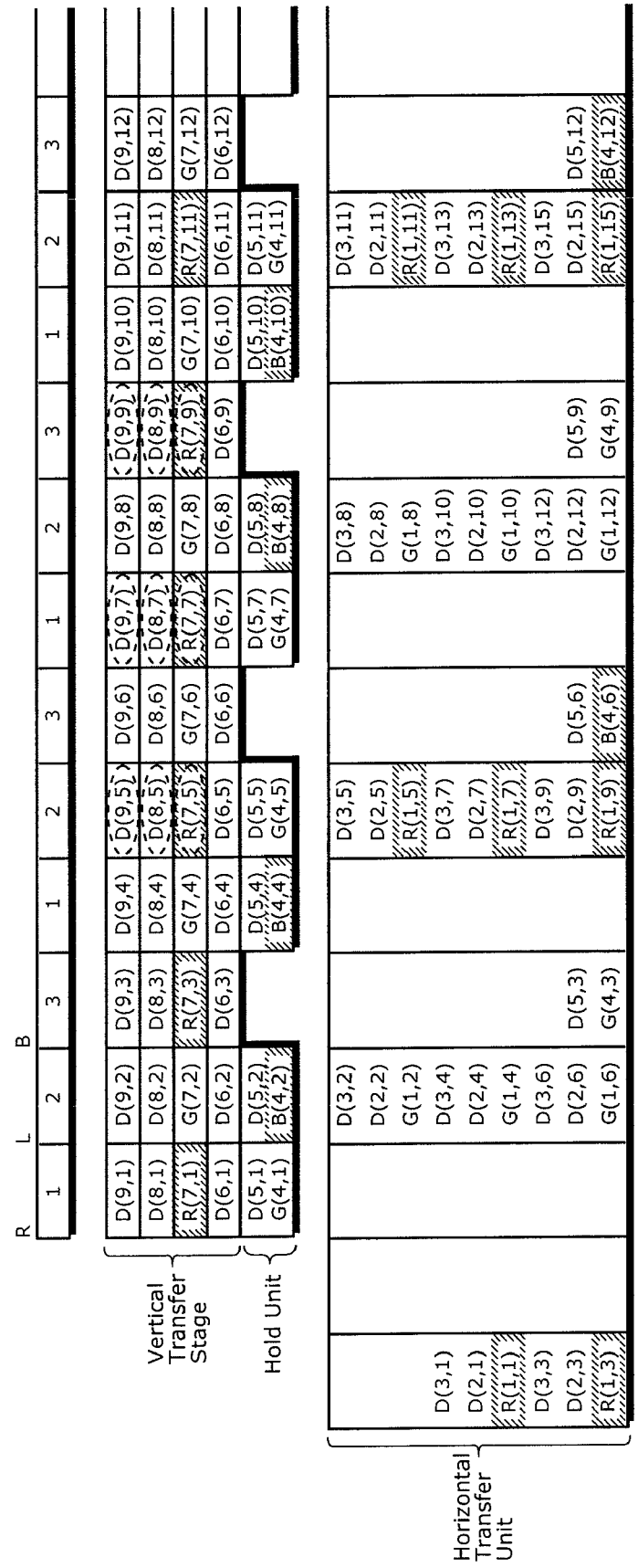
FIG. 5H is a diagram for explaining pixel mixing according to the second embodiment.

At step S5H, the timing generation circuit 20 drives the vertical transfer units 13 to perform one-stage vertical transfer for all columns, and drives the hold units 21a of R and L columns to be hold state. Thereby, each of the hold units 21a mixes a packet transferred from the vertical transfer unit 13 with a packet held in the hold unit. The result is shown in FIG. 5H.

Figure 5I:
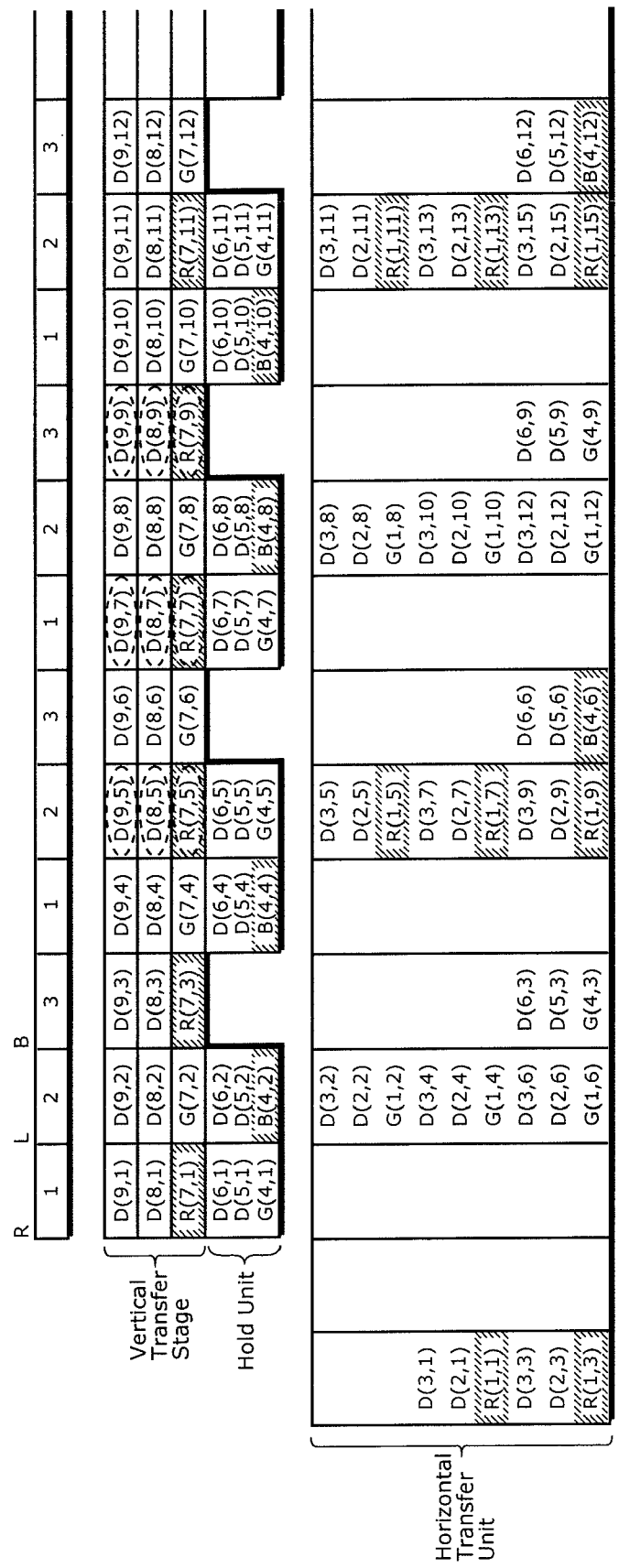
FIG. 5I is a diagram for explaining pixel mixing according to the second embodiment.

At step S5I, the timing generation circuit 20 drives the vertical transfer units 13 to perform one-stage vertical transfer for all columns, and drives the hold units 21a of R and L columns to be hold state. Thereby, each of the hold units 21a mixes a packet transferred from the vertical transfer unit 13 with packets held in the hold unit. The result is shown in FIG. 5I.

Figure 5J:
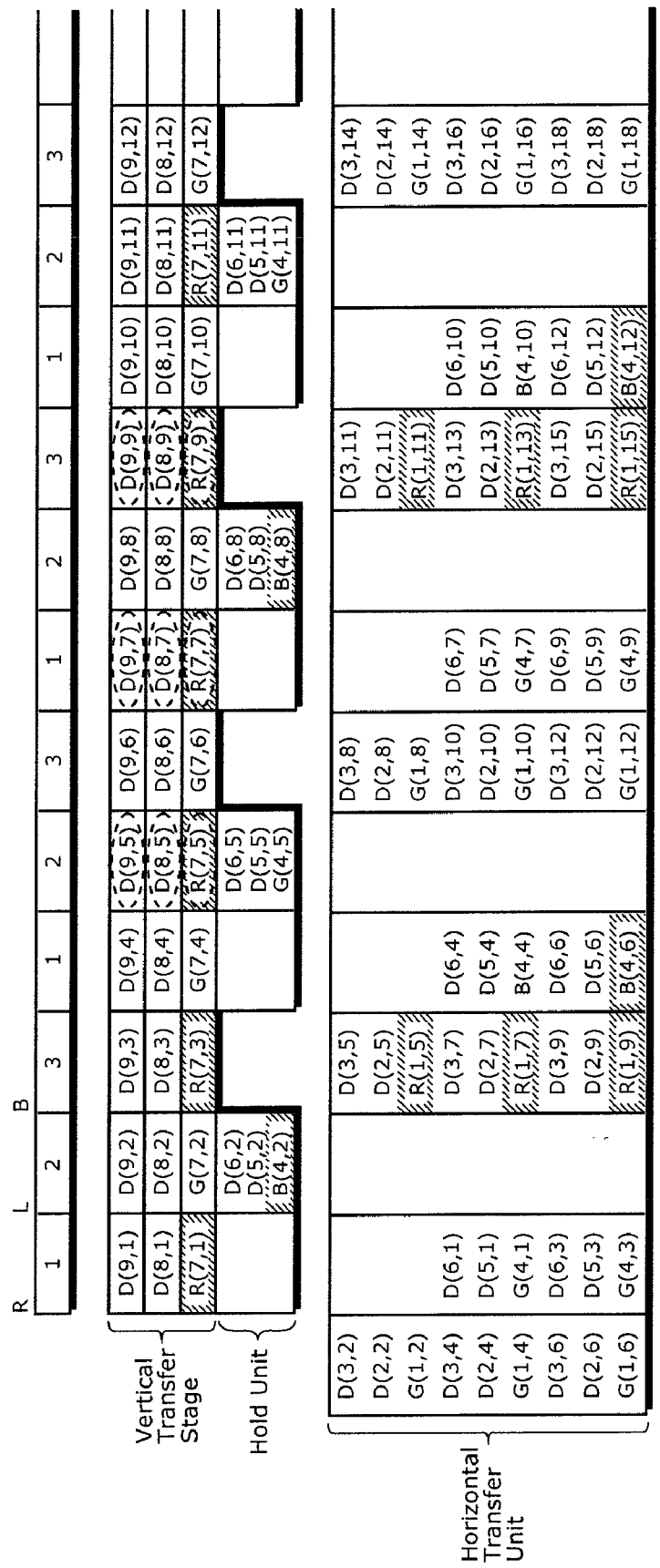
FIG. 5J is a diagram for explaining pixel mixing according to the second embodiment.

At step S5J, the timing generation circuit 20 drives the horizontal transfer unit 14 to perform two-stage horizontal transfer, and then drives the hold units 21a of R columns to transfer the mixed packets to the horizontal transfer unit 14. The result is shown in FIG. 5J.

Figure 5K:
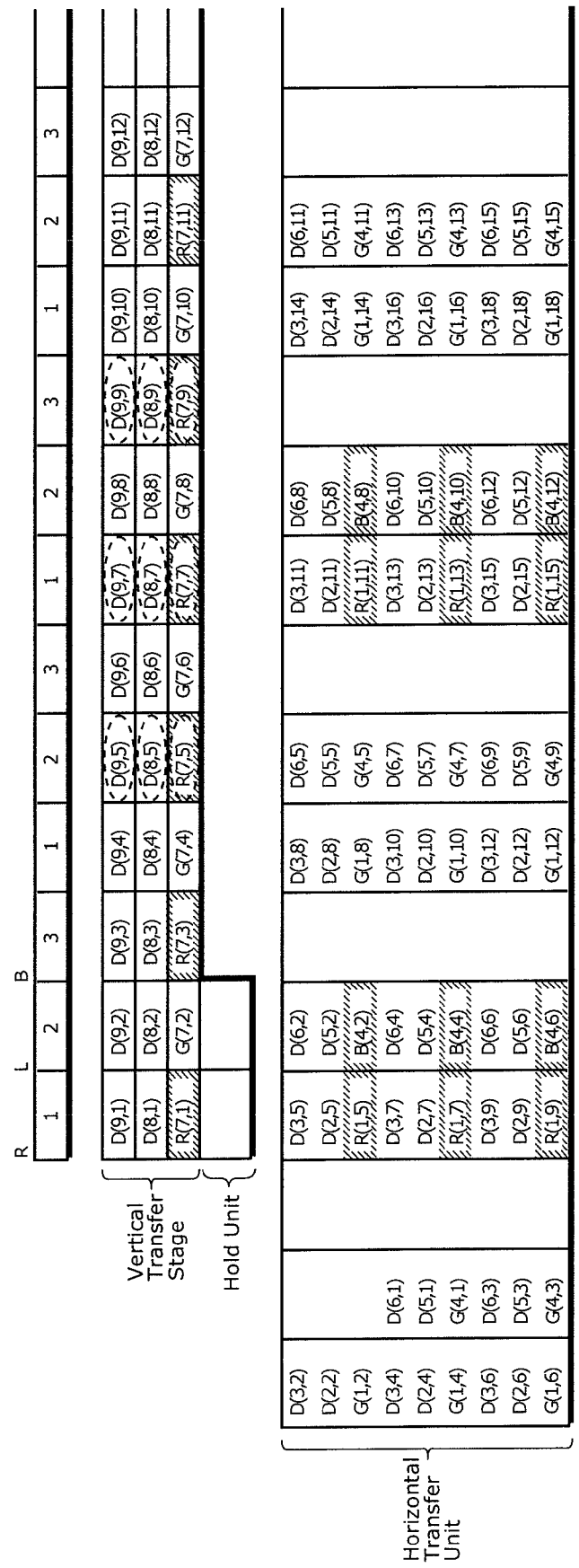
FIG. 5K is a diagram for explaining pixel mixing according to the second embodiment.

At step S5K, the timing generation circuit 20 drives the horizontal transfer unit 14 to perform two-stage horizontal transfer, and then drives the hold units 21a of L columns to transfer the mixed packets to the horizontal transfer unit 14. The result is shown in FIG. 5K.

Figure 5L:
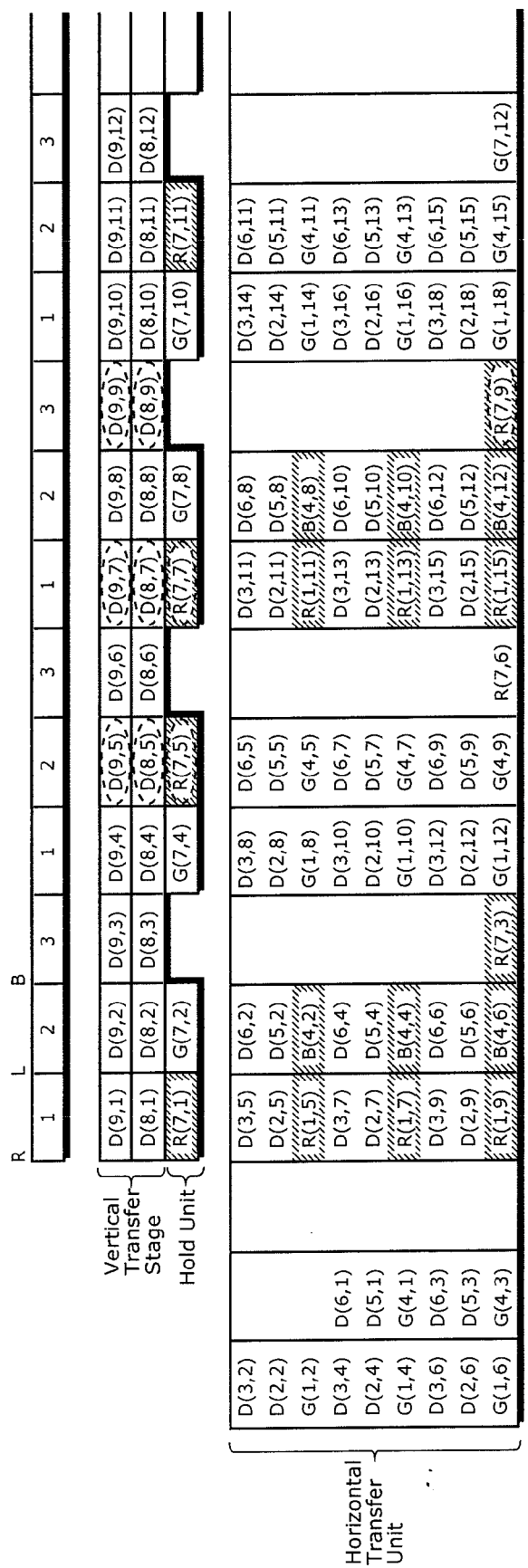
FIG. 5L is a diagram for explaining pixel mixing according to the second embodiment.

At step S5L, the timing generation circuit 20 drives the vertical transfer units 13 to perform one-stage vertical transfer for all columns, and drives the hold units 21a of R and L columns to be hold state. Thereby, each of the hold units 21a holds a packet transferred from the vertical transfer unit 13. The result is shown in FIG. 5L.

Figure 5M:
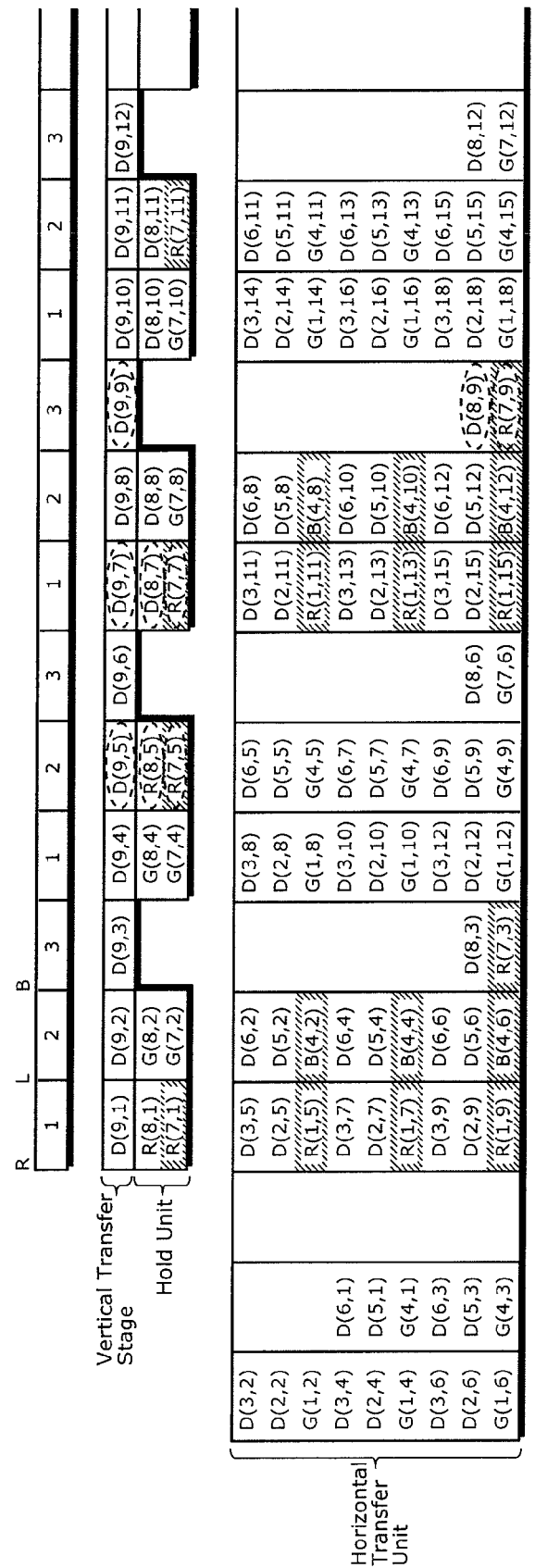
FIG. 5M is a diagram for explaining pixel mixing according to the second embodiment.

At step S5M, the timing generation circuit 20 drives the vertical transfer units 13 to perform one-stage vertical transfer for all columns, and drives the hold units 21a of R and L columns to be hold state. Thereby, each of the hold units 21a mixes a packet transferred from the vertical transfer unit 13 with a packet held in the hold unit. The result is shown in FIG. 5M.

Figure 5N:
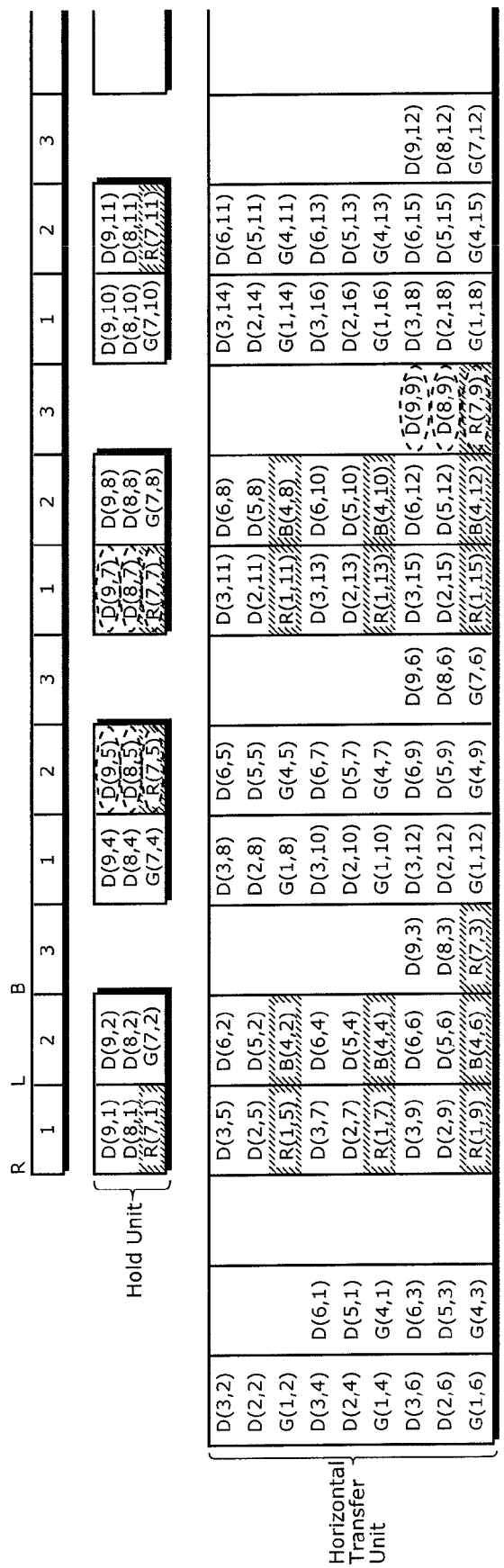
FIG. 5N is a diagram for explaining pixel mixing according to the second embodiment.
Figure 50:
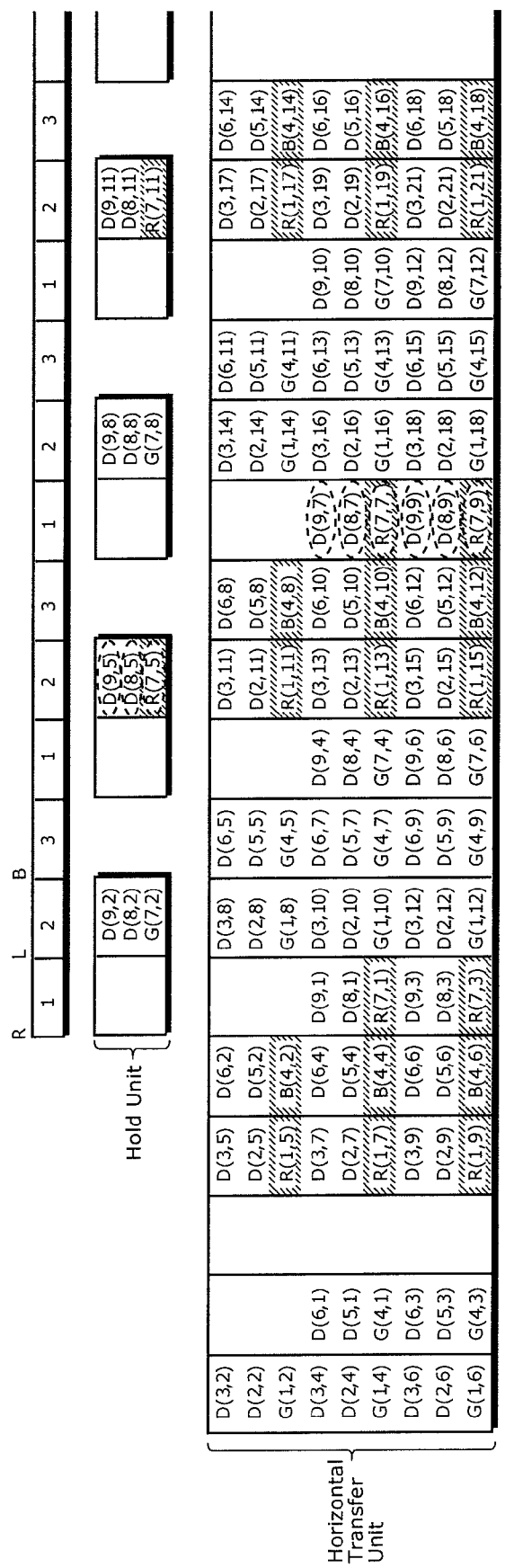
Figure 5P:
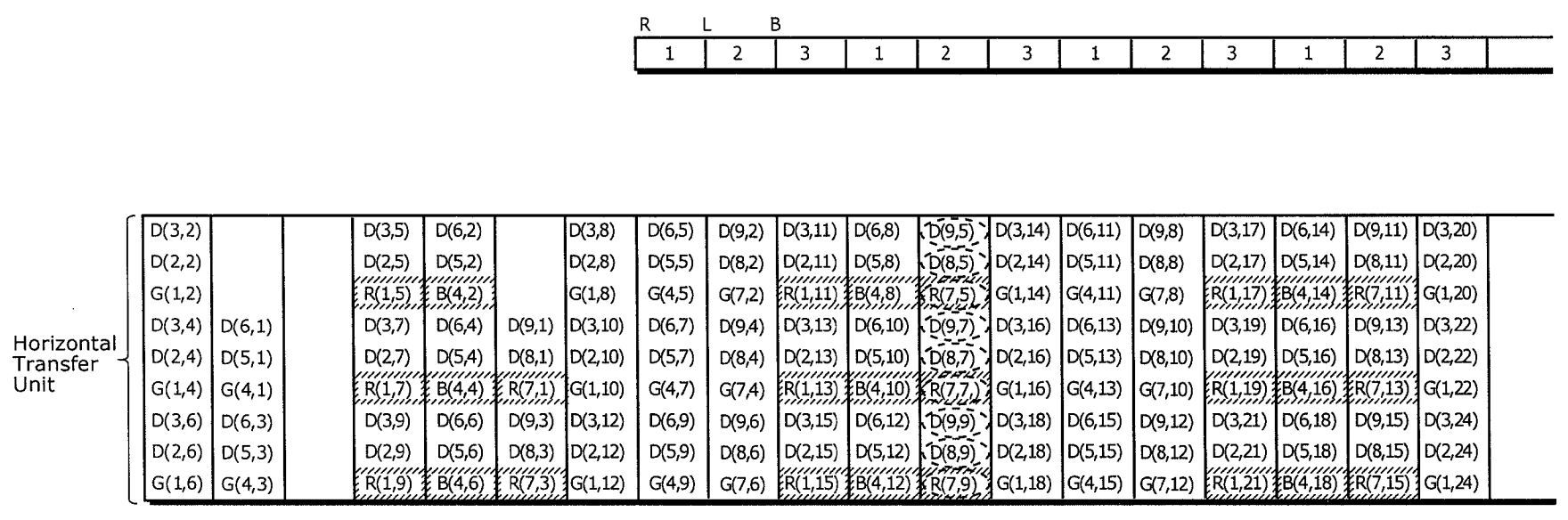

At step S5N, the timing generation circuit 20 drives the vertical transfer units 13 to perform one-stage vertical transfer for all columns, and drives the hold units 21a of R and L columns to be hold state. Thereby, each of the hold units 21a mixes a packet transferred from the vertical transfer unit 13 with packets held in the hold unit. The result is shown in FIG. 5N.

At step S5O, the timing generation circuit 20 drives the horizontal transfer unit 14 to perform two-stage horizontal transfer, and then drives the hold units 21a of R columns to transfer the mixed packets to the horizontal transfer unit 14. The result is shown in FIG. 5O.

At step S5P, the timing generation circuit 20 drives the horizontal transfer unit 14 to perform two-stage horizontal transfer, and then drives the hold units 21a of L columns to transfer the mixed packets to the horizontal transfer unit 14. The result is shown in FIG. 5P.

Then, at Step S500, the timing generation circuit 20 drives the horizontal transfer unit 14 to sequentially transfer pixel charges per row. At step S501, it is determined whether or not there is any signal packet in the vertical transfer unit 13 which has not yet been transferred. If the determination is made that there is no such a signal packet (Yes at S501), then the processing is complete. On the other hand, if there is any such a signal packet (No at S501), then the processing returns to step S5B to repeat the above-explained processing. Here, the determination at step S5201 may be made as to whether a predetermined number of rows have been transferred.

As described above, the solid-state imaging device according to the second embodiment includes the hold units, each of which is formed between the horizontal transfer unit and each of the vertical transfer units in N columns except M column in the column group, and which are operable to hold and transfer the charges independently in every N other columns.

Thus, since the hold units for holding and transferring charges are formed between the horizontal transfer unit 14 and respective vertical transfer units 13 in every N columns except M columns in the column groups, the number of gates becomes two gates at minimum (not shown) which is smaller than the number of gates in the hold units in the final transfer stages. As a result, transfer driving becomes easy which is suitable for speeding up a frame frequency.

Although in the first embodiment packets in B column are added in an order of a dummy packet, a signal packet, and a dummy packet, in the second embodiment, packets in every column are added in the same order of a signal packet, a dummy packet, and a dummy packet. This is because, in the second embodiment, when each hold unit of R and L columns mixes a signal packet with a 3rd-row dummy packet D(3, K), where K is an integer, the 3rd-row dummy packet in B column is mixed with a signal packet which has been already transferred by the horizontal transfer unit 14. This differs from the first embodiment. In the first embodiment, even if a 3rd-row dummy packet D(3, K) is to be mixed in the horizontal transfer unit, the final stage mixes the 3rd-row dummy packet with 4th-row signal packet B(4, K) or G(4, K) in R and L columns, so that the 3rd-row dummy packet is not able to be mixed with a 1st-row signal packet.

Third Embodiment

The following describes the third embodiment of the present invention. In the third embodiment, the processing of subtracting noise such as smears is performed in a structure of a camera in which the solid-stage imaging device according to the first and second embodiments is embedded. In the solid-stage imaging device according to the first and second embodiments, a column of a packet having noise components such as smears (hereinafter, referred to as "the second mixed packet") is identical to a column of a signal packet having valid pixel signals (hereinafter, referred to as "the first mixed packet"). In the third embodiment, the second mixed packet is obtained by storing, in a memory, noise components such as smears included in signals of a vertical optical black (OB) pixel, a vertical dummy pixel, a vertical empty transfer packet, and the like. An amount of the stored noise components is regarding one row or more. Then, subtraction is sequentially performed for horizontal transfer packets (first mixed packets) in a next field, thereby reducing noise such as smears. Thereby, in the third embodiment, noise can be reduced in the entire image.

Figure 7:
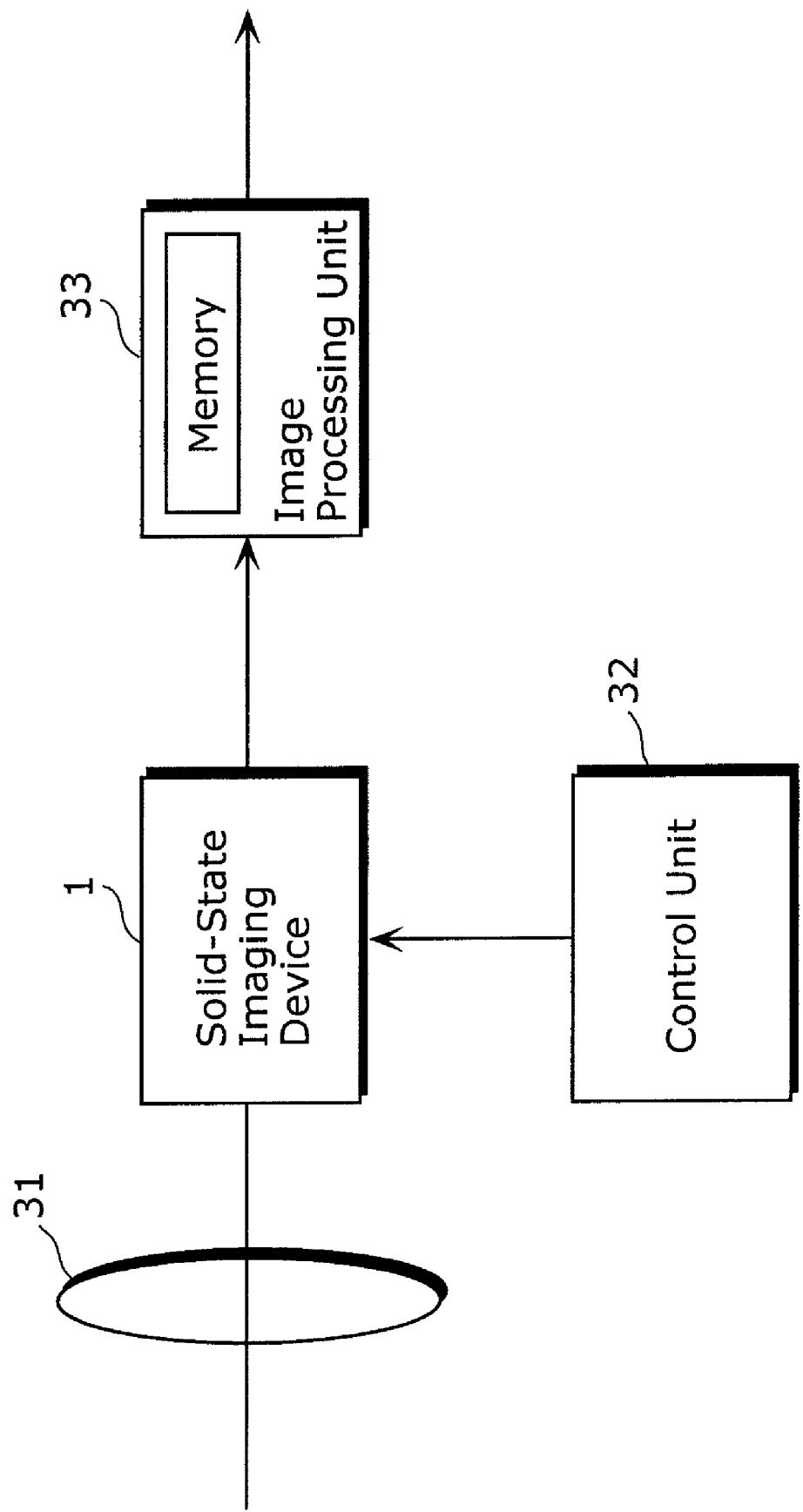
FIG. 7 is a schematic block diagram showing a structure of a camera according to the third embodiment of the present invention.

FIG. 7 is a schematic block diagram showing a structure of the camera according to the third embodiment.

The following describes the structure of the camera according to the third embodiment. Here, the camera is assumed to be a digital camera. This digital camera includes an optical system 31, a control unit 32, and an image processing unit 33. The optical system 31 includes a lens for imaging incident light from an object on an imaging area of a solid-stage imaging device 1. The control unit 32 controls driving of the solid-stage imaging device 1. The image processing unit 33 performs various image processing for output signals from the solid-stage imaging device 1.

The image processing unit 33 includes a memory, and performs inter-row (inter-field) noise subtraction processing between rows (fields). In the solid-state imaging devices according to the first and second embodiments, signal packets are not mixed with dummy packets of different columns, so that noise subtraction processing can be achieved between rows.

Figure 8:
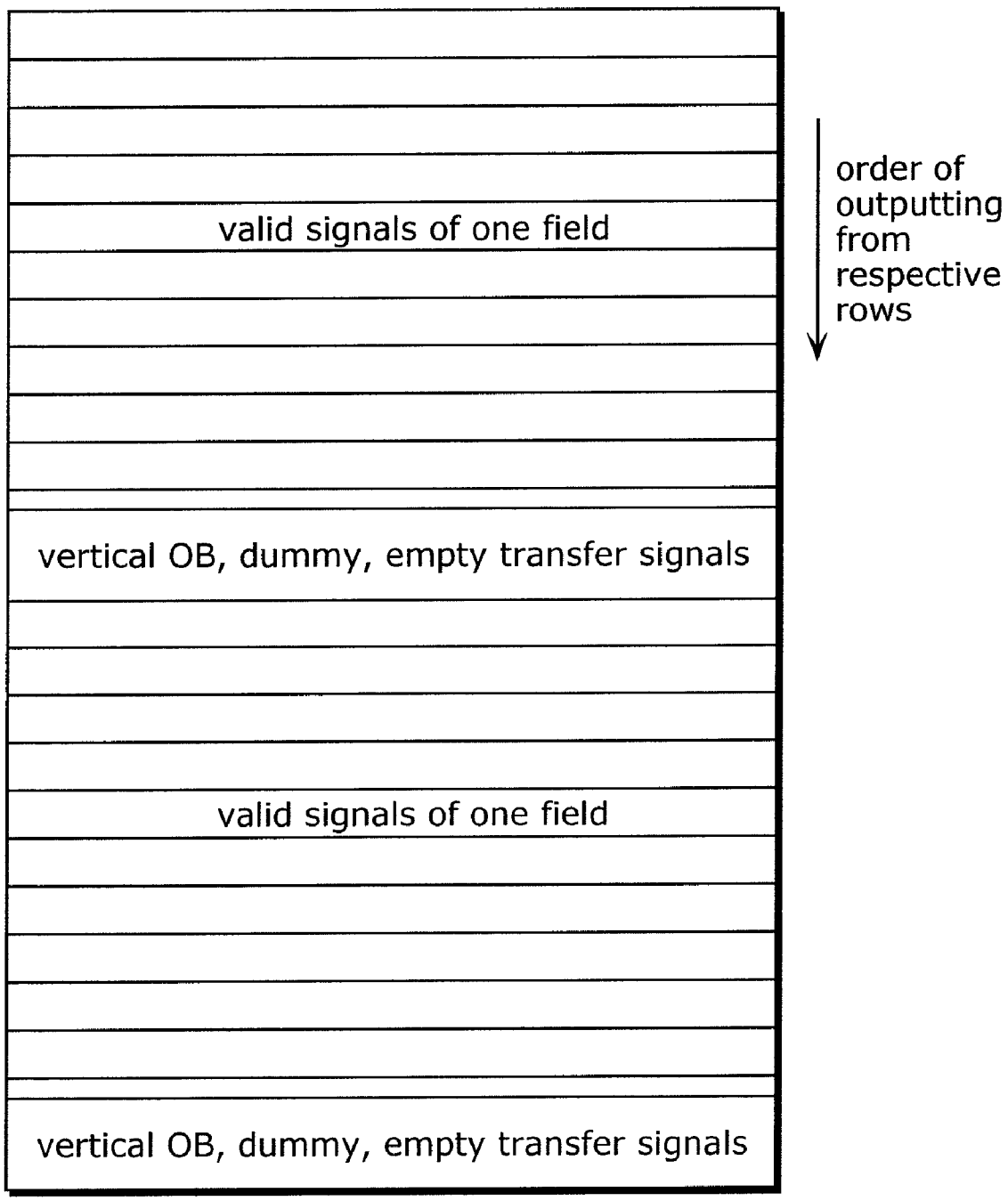
FIG. 8 is a diagram of inter-row noise subtraction processing.

FIG. 8 is a diagram showing signal output per field. For each field, after output of valid signal row, in-valid signals including signals of a vertical OB pixel, a vertical dummy pixel, a vertical empty transfer packet signal obtained by a vertical empty transfer, and the like are outputted. After that, valid signals of a next field are outputted.

Figure 9:
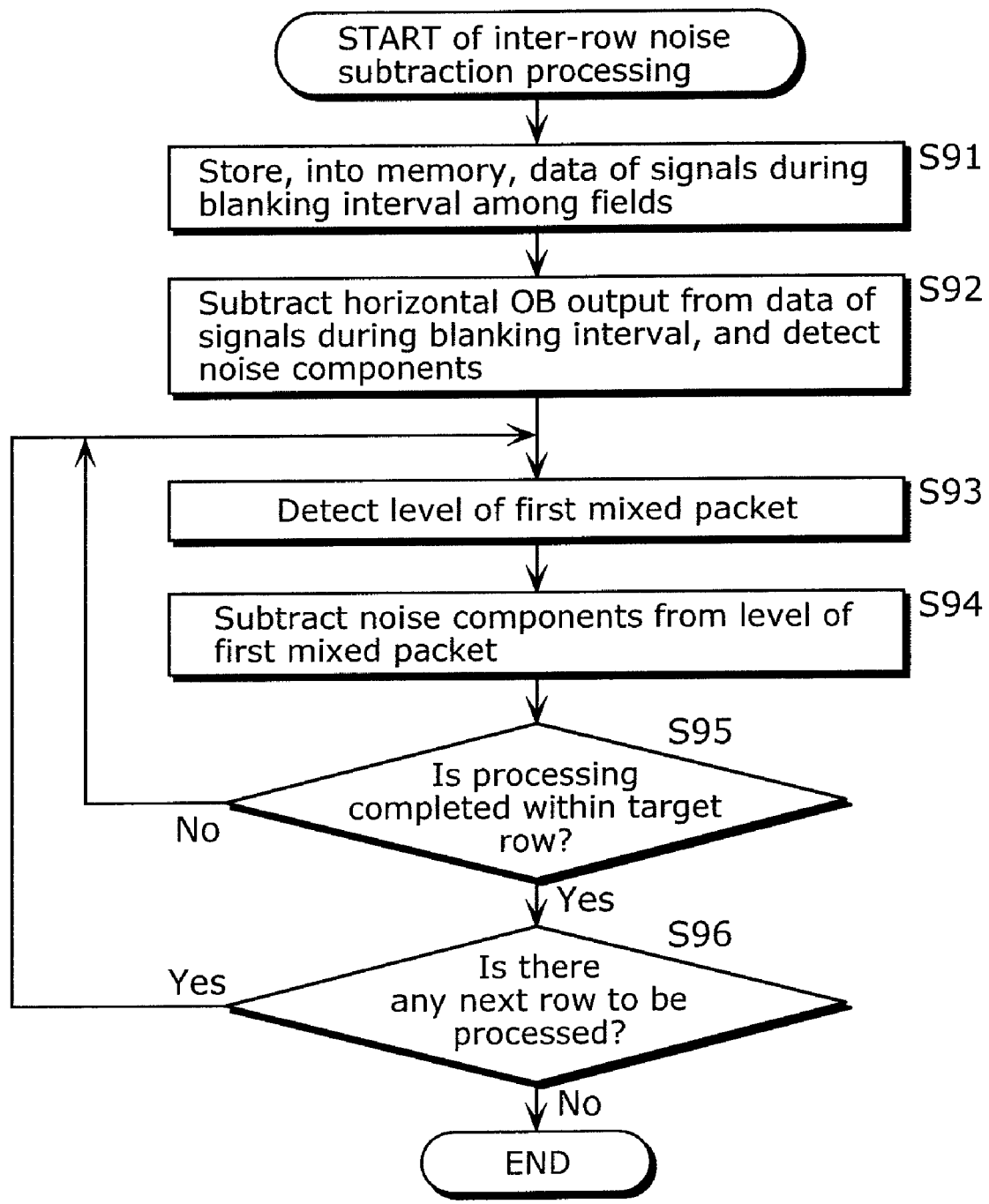
FIG. 9 is a flowchart of the inter-row noise subtraction processing.

FIG. 9 is a flowchart of the inter-row (inter-field) noise subtraction processing. As shown in FIG. 9, the image processing unit 33 stores a level of signals of each packet in at least one row among in-valid signals, into a memory as the second mixed packet (S91). The row stored in the memory includes signals of a vertical OB pixel, a vertical dummy pixel, a vertical empty transfer packet signal obtained by a vertical empty transfer, and the like. For example, the row whose signals are stored in the memory may be an in-valid signal output row, such as an optical black output row of light-receiving elements outputting optical black level, a dummy output row of dummy light-receiving elements, or an empty transfer output row outputting by vertical empty transfer.

Furthermore, the image processing unit 33 obtains difference between each signal level stored in the memory and a horizontal OB signal of each row, thereby calculates noise signals representing a level of noise components, and then stores the noise signals to the memory (S92).

In the above step, a packet including signal charges from dummy light-receiving elements or light-receiving elements outputting optical black levels is used as the second mixed packet, so that it is possible to detect noise components.

Then, the image processing unit 33, detects a signal level of the first mixed packet outputted from a horizontal selection unit (S94), selects a noise signal of the same row as the first mixed packet, and then performs subtraction processing (S95). The above steps S91 to S95 are performed for the signal packet in each valid signal row in a field (S96, S97).

By performing this noise subtraction processing, a column of the in-valid signal including noise components such as smears is identical to a column of the first mixed packet including signal components, which makes it possible to reduce noise components in signal packets within a field.

As described above, according to the camera, in the moving picture imaging mode, it is possible to reduce smear aliasing, and also improve image quality by the noise reduction processing.

Note that the vertical OB, vertical dummy, vertical empty transfer packets included in the in-valid signal may be located, as a separator between fields, prior or subsequent to a valid signal. It is desirable to use a in-valid signal temporally immediately prior to each valid signal.

Although only some exemplary embodiments of the present invention have been described in detail above, those skilled in the art will be readily appreciate that many modifications are possible in the exemplary embodiments without materially departing from the novel teachings and advantages of the present invention.

Accordingly, all such modifications are intended to be included within the scope of the present invention.

INDUSTRIAL APPLICABILITY

The present invention is suitable for a solid-state imaging device having a plurality of light-receiving elements formed on a semiconductor substrate, and a camera having the solid-state imaging device. For example, the present invention is suitable for a CCD image sensor, a digital still camera, a portable telephone having a camera function, a monitoring camera, a camera unit connected to an information processing apparatus, or the like.

What is claimed is:

1. A solid-state imaging device, comprising:
   a plurality of light-receiving elements arranged in rows and columns;
   a plurality of vertical transferors, each of which corresponds to one of the columns of said plurality of light-receiving elements and is operable to vertically transfer signal packets and dummy packets, the signal packets including charges read from said plurality of light-receiving elements, the dummy packets being packets other than the signal packets, N columns of said plurality of vertical transferors forming a column group;
   a plurality of holders arranged as final stages of said plurality of vertical transferors in the N columns except an M column in the column group, each of which is operable to mix, hold, and vertically transfer the charges of the signal packets and charges of the dummy packets without depending on a vertical transfer from upstream of a corresponding vertical transferor;
   a horizontal transferor operable to mix, hold, and horizontally transfer the charges transferred from one of said plurality of holders and a vertical transferor in the M column in the column group; and
   a driver operable to drive said plurality of vertical transferors, said plurality of holders, and said horizontal transferor,
   wherein said driver performs the driving so that a signal packet and a dummy packet in one of the columns are mixed together into a mixed packet in each of said plurality of holders, charges of the mixed packet are held in each of said plurality of holders, the held charges of the mixed packet are vertically transferred to said horizontal transferor so that the mixed packet of one of said plurality of holders is mixed with the mixed packet of another of said plurality of holders.

2. The solid-state imaging device according to claim 1, wherein said plurality of holders are final transfer stages of said vertical transferors in the N columns except the M column in the column group, and have independent transfer electrodes.

3. The solid-state imaging device according to claim 1, wherein said plurality of holders, each of which is formed between said horizontal transferor and one of said plurality of vertical transferors in the N columns except the M column in the column group, are operable to hold and transfer the charges independently in every N other columns.

4. The solid-state imaging device according to claim 1, further comprising:
a memory operable to store data representing each of the packets included in at least one of the rows, the packets being outputted from said horizontal transferor; and
a subtraction processor operable to reduce noise by performing subtraction processing using a first mixed packet and a second mixed packet, the first mixed packet being outputted from said horizontal transferor, and the second mixed packet being stored in said memory,
wherein the first mixed packet is a packet in which the signal packet and the dummy packet are mixed together, and
the second mixed packet is a dummy packet among the packets stored in said memory, the dummy packet being obtained from a same one of the columns as the first mixed packet.

5. The solid-state imaging device according to claim 4, wherein said memory is operable to store data of each of the packets included in at least one in-valid signal output row which is one of: an optical black output row of light-receiving elements outputting an optical black level; a dummy output row of dummy light-receiving elements; and an empty transfer output row outputting by vertical empty transfer.

6. A driving method of a solid-state imaging device, the solid-state imaging device including: a plurality of light-receiving elements arranged in rows and columns; a plurality of vertical transferors, each of which corresponds to one of the columns of the plurality of light-receiving elements and is operable to vertically transfer signal packets and dummy packets, the signal packets including charges read from the plurality of light-receiving elements, the dummy packets being packets other than the signal packets, N columns of the plurality of vertical transferors forming a column group; a plurality of holders arranged as final stages of the plurality of vertical transferors in the N columns except an M column in the column group, each of which is operable to mix, hold, and vertically transfer the charges of the signal packets and charges of the dummy packets without depending on vertical transfer from upstream of a corresponding vertical transferor; a horizontal transferor operable to mix, hold, and horizontally transfer the charges transferred from one of the plurality of holders and a vertical transferor in the M column in the column group; and a driver operable to drive the vertical transferors, the plurality of holders, and the horizontal transferor, said driving method comprising:
mixing a signal packet and a dummy packet in one of the columns into a mixed packet in each of the plurality of holders;
holding charges of the mixed packet in each of the plurality of holders; and
vertically transferring the charges of the mixed packet from each of the plurality of holders to the horizontal transferor so that the mixed packet of one of the plurality of holders is mixed with the mixed packet of another of the plurality of holders.

7. A camera comprising the solid-state imaging device according to claim 1.

* * * * *